US012467921B2

(12) United States Patent
Teng et al.

(10) Patent No.: US 12,467,921 B2
(45) Date of Patent: Nov. 11, 2025

(54) **ANTIBODIES AND ASSAYS FOR DETECTION OF *BURKHOLDERIA MALLEI***

(71) Applicants: Versitech Limited, Hong Kong (CN); Central Veterinary Research Laboratory, Dubai (AE)

(72) Inventors: Lee Lee Teng, Hong Kong (CN); Patrick Chiu Yat Woo, Hong Kong (CN); Elaine Chan, Hong Kong (CN); Susanna Kar Pui Lau, Hong Kong (CN); Man Lung Yeung, Hong Kong (CN); Ulrich Wernery, Dubai (AE)

(73) Assignees: Versitech Limited, Hong Kong (CN); Central Veterinary Research Laboratory, Dubai (AE)

( * ) Notice: Subject to any disclaimer, the term of this patent is extended or adjusted under 35 U.S.C. 154(b) by 15 days.

(21) Appl. No.: 17/463,109

(22) Filed: Aug. 31, 2021

(65) Prior Publication Data

US 2023/0075982 A1    Mar. 9, 2023

(51) Int. Cl.
*C07K 16/12* (2006.01)
*G01N 33/569* (2006.01)

(52) U.S. Cl.
CPC .... *G01N 33/56911* (2013.01); *C07K 16/1203* (2013.01); *C07K 2317/24* (2013.01); *C07K 2317/565* (2013.01); *C07K 2317/567* (2013.01); *G01N 2400/50* (2013.01); *G01N 2469/20* (2013.01)

(58) Field of Classification Search
CPC ......... G01N 33/56911; G01N 2400/50; G01N 2469/20; C07K 16/1203; C07K 2317/24; C07K 2317/565; C07K 2317/567
See application file for complete search history.

(56) References Cited

U.S. PATENT DOCUMENTS

| | | |
|---|---|---|
| 4,444,887 A | 4/1984 | Hoffmann |
| 4,716,111 A | 12/1987 | Osband et al. |
| 4,816,567 A | 3/1989 | Cabilly |
| 5,225,539 A | 7/1993 | Winter |
| 5,530,101 A | 6/1996 | Queen |
| 5,565,332 A | 10/1996 | Hoogenboom |
| 5,585,089 A | 12/1996 | Queen |
| 5,766,886 A | 6/1998 | Studnicka |
| 5,807,715 A | 9/1998 | Morrison |
| 5,916,771 A | 6/1999 | Hori |
| 5,939,598 A | 8/1999 | Kucherlapati |
| 6,311,415 B1 | 11/2001 | Lind |
| 6,350,861 B1 | 2/2002 | Co |
| 6,407,213 B1 | 6/2002 | Carter |
| 2003/0229208 A1 | 12/2003 | Queen |
| 2004/0049014 A1 | 3/2004 | Queen |
| 2005/0037000 A1 | 2/2005 | Stavenhagen |
| 2005/0064514 A1 | 3/2005 | Stavenhagen |

FOREIGN PATENT DOCUMENTS

| | | |
|---|---|---|
| EP | 239400 | 9/1987 |
| EP | 519596 | 12/1992 |
| EP | 592106 | 4/1994 |
| WO | 9109967 | 7/1991 |
| WO | 9110741 | 7/1991 |
| WO | 9317105 | 9/1992 |
| WO | 9633735 | 10/1996 |
| WO | 9816654 | 4/1998 |
| WO | 9824893 | 6/1998 |
| WO | 9846645 | 10/1998 |
| WO | 9850433 | 11/1998 |

OTHER PUBLICATIONS

Hollinger et al.Engineered antibody fragments and the rise of single domains.Nature Biotechnology. vol. 23 No. 9 Sep. 2005. (Year: 2005).*
Holt et al. Domain antibodies: proteins for therapy. Trends in Biotechnology vol. 21 No. 11 Nov. 2003 (Year: 2003).*
Lloyd et al.Modelling the human immune response: performance of a 1011 human antibody repertoire against a broad panel of therapeutically relevant antigens.Protein Engineering, Design & Selection vol. 22 No. 3 pp. 159-168, 2009 (Year: 2009).*
Rabia et al Understanding and overcoming trade-offs between antibody affinity, specificity, stability and solubility (Biochemical Engineering Journal 137 (2018) 365-374) (Year: 2018).*
Townsend et al.Significant Differences in Physiochemical Properties of Human Immunoglobulin Kappa and Lambda CDR3 Regions. Frontiers in Immunology. Sep. 2016, vol. 7,article 388. (Year: 2016).*
Baca, et al., "Antibody Humanization Using Monovalent Phage Display", J. Biol. Chem., 272(16):10678-10684 (1997).
Balder, et al., "Identification of Burkholderia mallei and Burkholderia pseudomallei adhesins for human respiratory epithelial cells", BMC Microbiology, 10(250):1-19 (2010).
Caldas, et al., "Design and synthesis of germline-based hemi-humanized single-chain Fv against the CD18 surface antigen", Protein Eng., 13(5):353-360 (2000).

(Continued)

*Primary Examiner* — Janet L Andres
*Assistant Examiner* — Brian Hartnett
(74) *Attorney, Agent, or Firm* — Pabst Patent Group LLP

(57) ABSTRACT

Disclosed are B5 hybridoma and a B5 monoclonal antibody to *Burkholderia mallei, Burkholderia pseudomallei,* or *Burkholderia thailandensis* and methods of use. Also disclosed are isolated binding fragments, isolated antibody fragments, isolated monoclonal antibodies, isolated chimeric antibodies, and isolated humanized antibodies having the binding fragments of the B5 monoclonal antibody. Also disclosed are assays for detecting *B. mallei, B. pseudomallei,* or *B. thailandensis* in a sample, for detecting infection by *B. mallei, B. pseudomallei,* or *B. thailandensis,* and therapeutic methods for treating infections by *B. mallei, B. pseudomallei,* or *B. thailandensis.*

49 Claims, 5 Drawing Sheets

(56) References Cited

OTHER PUBLICATIONS

Casey, et al., "Tumour targeting of humanised cross-linked divalent-fab' antibody fragments: a clinical phase I/II study", Br. J. Cancer, 86:1401-1410 (2002).
Chothia, et al., "Canonical Structures for the Hypervariable Regions of Immunoglobulins", J. Mol. Biol., 196:901-917 (1987).
Chothia, et al., "Structural determinants in the sequences of immunoglobulin variable domain", J. Mol. Biol., 278(2):457-79 (1998).
Cortez-Retamozo, et al., "Efficient Cancer Therapy with a Nanobody-Based Conjugate", Cancer Res., 64:2853-2857 (2004).
De Genst, et al., "Chemical Basis for the Affinity Maturation of a Camel Single Domain Antibody", J. Biol. Chem., 279(51):53593-53601 (2004).
De Genst, et al., "Strong in Vivo Maturation Compensates for Structurally Restricted H3 Loops in Antibody Repertoires", J. Biol. Chem., 280(14):14114-14121 (2005).
Dooley, et al., "Shark immunity bites back: affinity maturation and memory response in the nurse shark, Ginglymostoma cirratum", Eur. J. Immunol., 35(3):936-945 (2005).
Gillies, et al., "High-level expression of chimeric antibodies using adapted cDNA variable region cassettes", J. Immunol. Methods, 125(1-2):191-202 (1989).
Griffiths, et al., "Reagents and methods for PET using bispecific antibody pretargeting and 68Ga-radiolabeled bivalent hapten-peptide-chelate conjugates", J. Nucl. Med., 45(1):30-39 (2004).
Holliger, et al., "Engineered antibody fragments and the rise of single domains", Nature Biotech., 23(9):1126-1136 (2005).
Kenanova, et al., "Tailoring the pharmacokinetics and positron emission tomography imaging properties of anti-carcinoembryonic antigen single-chain Fv-Fc antibody fragments", Cancer Res., 65(2):622-631 (2005).
Khaki, et al., "Glanders outbreak at Tehran Zoo, Iran", Iran J. Microbiol., 4(1):3-7 (2012).
Khan, et al., "Glanders in animals: a review on epidemiology, clinical presentation, diagnosis and countermeasures", Transbound Emerg. Dis., 60(3):204-221 (2013).
Le Gall, et al., "Effect of linker sequences between the antibody variable domains on the formation, stability and biological activity of a bispecific tandem diabody", Protein Eng. Des. Sel., 17(4):357-366 (2004).
Linsley, "New look at an old costimulator", Nat. Immunol., 6(3):231-232 (2005).
Lonberg, et al., "Human Antibodies from Transgenic Mice", Int. Rev. Immunol., 13(1):65-93 (1995).
Martelli, et al., "Influenza A(H1N1)pdm09 Virus Infection in a Captive Giant Panda, Hong Kong", Emerg. Infect. Dis., 25(12):2303-2306 (2019).
Morea, et al., "Antibody modeling: implications for engineering and design", Methods, 20(3):267-79 (2000).
Padlan, "A possible procedure for reducing the immunogenicity of antibody variable domains while preserving their ligand-binding properties", Molecular Immunology, 28(4-5):489-498 (1991).
Power, et al., "Generation of recombinant multimeric antibody fragments for tumor diagnosis and therapy", Methods Mol. Biol., 207:335-350 (2003).
Riechmann, et al., "Reshaping human antibodies for therapy", Nature, 332:323-327 (1988).
Roguska, et al., "Humanization of murine monoclonal antibodies through variable domain resurfacing", PNAS, 91:969-973 (1994).
Srinivasan, et al., "Glanders in a military research microbiologist", N. Engl. J. Med., 345(4):256-258 (2001).
Streltsov, et al., "Do sharks have a new antibody lineage?", Immunol. Lett., 97(1):159-160 (2005).
Streltsov, et al., "Structural evidence for evolution of shark Ig new antigen receptor variable domain antibodies from a cell-surface receptor", PNAS, 101(34):12444-12449 (2004).
Studnicka, et al., "Human-engineered monoclonal antibodies retain full specific binding activity by preserving non-CDR complementarity-modulating residues", Protein Engineering, 7(6):805-814 (1994).
Tan, et al., "'Superhumanized' antibodies: reduction of immunogenic potential by complementarity-determining region grafting with human germline sequences: application to an anti-CD28", J. Immunol., 169(2):1119-25 (2002).
Weir, et al., "Formatting antibody fragments to mediate specific therapeutic functions", Biochem. Soc. Trans., 30(4):512-516 (2002).
Wernery, et al., "Natural Burkholderia mallei infection in Dromedary, Bahrain", Emerg. Infect. Dis., 17(7):1277-1279 (2011).
Wernery, et al., "Serodiagnosis of aspergillosis in falcons (*Falco* spp.) by an Afmp1p-based enzyme-linked immunosorbent assay", Mycoses, 61(8):600-609 (2018).
Yokoyama, "Production of monoclonal antibody supernatant and ascites fluid", Curr. Protoc. Mol. Biol., 11:11.10 (2008).

\* cited by examiner

ANTIBODIES AND ASSAYS FOR DETECTION OF *BURKHOLDERIA MALLEI*

DEPOSIT OF THE B5 MONOCLONAL ANTIBODY

B5 Monoclonal Antibody to purified *Burkholderia mallei* lipopolysaccharide (LPS) was deposited by University of Hong Kong on May 24, 2021, under the terms of the Budapest Treaty on the International Recognition of the Deposit of Microorganisms for the purposes of Patent Procedure with the American Type Culture Collection ("ATCC"), Manassas, VA 20110-2209, United States, Patent Deposit Designation PTA-127021 (herein referred to as "B5 hybridoma cell line as deposited"). The deposited antibody will be maintained for at least 30 years from the date of deposit or five years from the most recent request for a sample, whichever is longer. The deposited antibody will be made available upon written request to the ATCC. In accordance with 37 C.F.R. § 1.808(a)(2), all restrictions imposed by the depositor on the availability to the public of the deposited material will be irrevocably removed upon the granting of the patent. Applicants state that the deposited antibody will be irrevocably without restriction released to the public upon issuance of the patent.

FIELD OF THE INVENTION

This invention is generally directed to antibodies and tests for detecting *B. mallei* and methods for making and using thereof.

BACKGROUND OF THE INVENTION

*Burkholderia mallei* (*B. mallei*) *B. mallei* is a highly evolved obligate parasite of horses, mules, and donkeys with no other known natural reservoir (Balder et al., *BMC Microbiology*, 10:250 1-19 (2010)). Glanders is a highly contagious and potentially serious disease caused by *B. mallei*—a highly pathogenic, Gram-negative β-proteobacterium, endemic in the Middle East, Asia, Africa and South America (Khan, et al., *Transbound Emerg. Dis.*, 60(3):204-221 (2013); World Organization for Animal Health (OIE), *Manual of diagnostic tests and vaccines for terrestrial animals*, 8th Ed. OIE, Paris, France pp. 1350-1362 (2019)). Although glanders mainly occurs in horses, donkeys and mules, the bacterium also infects other mammals, such as carnivores, through ingestion of meat from sick animals (Wernery, et al., *Emerg. Infect. Dis.*, 17(7):1277-1279 (2011); Khaki, et al., *Iran J. Microbiol.*, 4(1):3-7 (2012); Alibasoglu, et al., *Berl Münch Tierärztl Wochenschr*, 99(2): 57-63 (1986)).

In animals, glanders is usually acquired through close contact, inhalation or the ingestion of contaminated feed or water. *B. mallei* occasionally infects human through contact with infected animals. Laboratory-acquired infections have also been reported (Srinivasan, et al., *N Engl J Med.*, 345(4):256-258 (2001)). Due to the high fatality of the disease, aerosol transmissibility of the infectious agent and small number of bacteria required to establish an infection, *B. mallei* has been classified as a category B bioterrorism agent by the Centers for Disease Control and Prevention, USA (Centers for Disease Control and Prevention. Bioterrorism Agents/Diseases. Last revised Apr. 4, 2018).

However, laboratory diagnosis of glanders are difficult. The bacterium is often not readily isolated from clinical specimens and may not be correctly identified even when isolated.

There are serodiagnosis for glanders that detect *B. mallei* antibodies in serum samples of infected animals, such as Haemagglutinin inhibition tests and ELISA. Haemagglutinin inhibition tests cannot perform specific serological tests. Additionally, such non-specific serological tests are only available for a limited number of infections. ELISA that detects the presence of antibodies in different types of animals requires secondary antibodies against each type of animals. However, secondary antibodies against some groups of animals may not be readily available (Martelli, et al., *Emerg. Infect. Dis.*, 25(12); 2303-2306 (2019); Wernery, et al., *Mycoses.*, 61(8):600-609 (2018)). Even if these secondary antibodies are available, setting up such tests for various types of animals require various types of secondary antibodies, which is cost inefficient.

There remains a need for compositions and tests that can detect *B. mallei* or its infection in a variety of animals.

Therefore, it is the object of the present invention to provide compositions and tests that can detect *B. mallei* or its infection in a variety of animals.

It is another object of the present invention to provide methods of making the compositions and tests that can detect *B. mallei* or its infection in a variety of animals.

It is yet another object of the present invention to provide methods of using the compositions and tests that can detect *B. mallei* or its infection in a variety of animals.

SUMMARY OF THE INVENTION

Described are antibodies and antibody binding fragments with high specificity to purified *Burkholderia mallei* lipopolysaccharide (LPS). The antibodies and the antibody binding fragments typically have the binding fragments of the B5 monoclonal antibody produced by the B5 hybridoma cell line as deposited on May 24, 2021, with the American Type Culture Collection (ATCC®) Patent Depository (10801 University Boulevard, Manassas, Virginia 20110 USA), and given the Patent Deposit Number PTA-127021 (referred to herein as "B5 hybridoma cell line as deposited"). The monoclonal antibody produced from the B5 hybridoma cell line as deposited is referred to herein as "B5 antibody." The binding fragments of the B5 antibody may cross-react with antigens from *Burkholderia pseudomallei* and *Burkholderia thailandensis* and are useful for detecting the presence of or an infection by *B. mallei*, *B. pseudomallei*, or *B. thailandensis* in a variety of animals. The binding fragments of the B5 antibody may also be used in therapeutic methods for treating infections with *B. mallei*, *B. pseudomallei*, or *B. thailandensis*.

The antibodies and antibody binding fragments may be in a form of isolated monoclonal antibodies, isolated chimeric antibodies, or isolated humanized antibodies. Typically, the antibody binding fragment induces, in an N- to C-direction, the following structural domains:

N-FR1-CDR1-FR2-CDR2-FR3-CDR3-FR4-C wherein
  FR denotes a framework region and CDR denotes a complementary determining region, and
  wherein the antibody binding fragment is produced from the B5 hybridoma cell line as deposited.

The antibody binding fragment has a high binding specificity to purified LPS from *B. mallei*, *B. pseudomallei*, or *B. thailandensis*. The high binding specificity may be shown in an immunoassay as a relative binding specificity. A high binding specificity to a specific antigen, e.g., purified LPS from *B. mallei*, *B. pseudomallei*, or *B. thailandensis*, may be relative to a binding specificity to an unrelated, control antigen, such as bovine serum albumin (BSA). For example, a relative binding specificity for the B5 antibody may be presented as binding to purified *B. mallei* LPS, purified *B. pseudomallei* LPS, or purified *B. thailandensis* LPS, that produces a detection signal that is at least two times over the detection signal produced from binding to the same amount of an unrelated antigen, such as BSA. The high binding specificity of the B5 antibody may be shown in an immunoassay assay, such as an enzyme linked immunosorbent assay (ELISA). The B5 antibody may be used in the ELISA at a concentration between about 1 ng/μl and 10 ng/μl against a specific antigen and an unrelated antigen (such as purified LPS from *B. mallei, B. pseudomallei,* or *B. thailandensis* as the specific antigen, and BSA as an unrelated antigen), at the antigen concentration between about 0.1 ng and 10 ng, and produce a ratio of the detection signal between about 2:1 and 50:1. For example, in an ELISA to a purified *B. mallei* LPS at 0.5 ng or to bovine serum albumin (BSA) at 0.5 ng, the ratio of the detection signal from binding to *B. mallei* LPS at 0.5 ng to a detection signal from binding to BSA at 0.5 ng may be between about 2:1, about 5:1, about 6:1, about 7:1, about 8:1, about 9:1, about 10:1, about 15:1, about 20:1, or more, when the B5 antibody is used at a concentration between about 1 ng/μl and 10 ng/μl.

Kits containing antibodies with the antibody binding fragments of the B5 antibody are also described. Immunoassays and competitive immunoassays with the antibodies containing the antibody binding fragments of the B5 antibody are also described. Methods of detecting the presence, absence, and/or the concentration of *B. mallei* antibody in a test sample at high sensitivity (over 95%) and high specificity (over 95%), are described.

An exemplary immunoassay is a competitive ELISA method of detecting the presence, absence, and/or the concentration of *B. mallei* antibody in a test sample at high sensitivity (over 95%) and high specificity (over 95%). The competitive ELISA typically includes (a) contacting a *B. mallei, B. pseudomallei,* or *B. thailandensis* antigen with a test sample in a test vessel and in a control vessel, (b) contacting a *B. mallei, B. pseudomallei,* or *B. thailandensis* antigen with the isolated B5 monoclonal antibody in the test vessel and, optionally, with an antibody-detection label conjugate in a control vessel, (c) developing a signal in the test vessel and the control vessel, and (d) measuring the signal from the test vessel and the control vessel. Typically, the antigen is a purified *B. mallei, B. pseudomallei,* or *B. thailandensis* LPS used at a concentration between about 0.1 ng and about 10 ng. The isolated B5 monoclonal antibody is typically used at a concentration between about 1 ng/μl and 10 ng/μl. The test sample may be a diluted sample obtained from a subject, such as a sample from a human, a non human primate, domestic animal, farm animal, or a laboratory animal, diluted at a ratio between about 1:5 and 1:500 (v/v) of the sample to a sample dilution buffer. The test sample may be from a bodily fluid or mucus, such as from saliva, sputum, tear, sweat, urine, exudate, blood, serum, plasma, or a vaginal discharge. The test samples are typically used at a dilution between about 1:5 and 1:500, preferably between about 1:5 and 1:50, such as 1:10 or 1:20 (v/v) of the sample to a sample dilution buffer.

The exemplary competitive ELISA method also includes the steps of obtaining a signal from (d) for the test vessel, obtaining a signal from (d) for the control vessel, and converting the signal from the test vessel and the signal from the control vessel to a Percentage Inhibition ("PI") value according to the formula:

PI=100−[(signal of test vessel/signal of the control vessel)×100]

to detect the presence, absence, and/or the concentration of *B. mallei* antibody.

The competitive ELISA method with the isolated B5 monoclonal antibody typically detects the presence of *B. mallei* antibody in the test sample with a sensitivity above 95%, such as between 95% and 100% sensitivity, and specificity above 95%, such as between 95% and 100% specificity, when the signal measured in (d) produces PI above about 39%, such as above 39.6%, or above 40%.

The competitive ELISA method with the isolated B5 monoclonal antibody typically detects the absence of *B. mallei* antibody in the test sample with a sensitivity above 95%, such as between 95% and 100% sensitivity, and specificity above 95%, such as between 95% and 100% specificity, when the signal measured in (d) produces PI below about 40%, such as below 39.6%, or below 39%.

The kits, assays, and methods use *B. mallei* as the exemplary organism to demonstrate the use of the B5 antibody in compositions, kits, assays, and methods that can detect *B. mallei, B. pseudomallei,* or *B. thailandensis* and protect against infections with *B. mallei, B. pseudomallei,* or *B. thailandensis*.

DETAILED DESCRIPTION OF THE INVENTION

I. Definitions

Figure 1A:
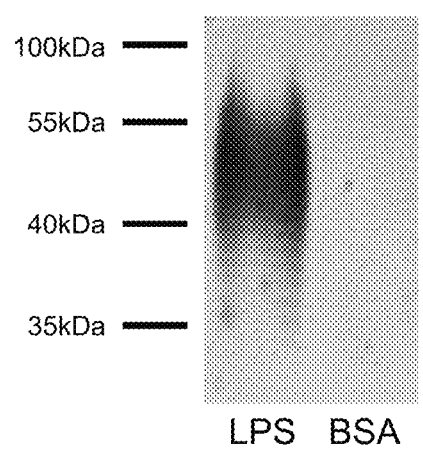
FIG. 1A is an image of Western blot, showing the specificity of the produced mouse monoclonal anti-lipopolysaccharide (LPS) antibody B5 against *B. mallei* LPS (5 ng) and bovine serum albumin (BSA; 5 μg).

As used herein, the term "antibody" refers to monoclonal antibodies. In addition to intact immunoglobulin molecules, also included are fragments or polymers of those immunoglobulin molecules, and human or humanized versions of immunoglobulin molecules or fragments thereof, as long as the molecules maintain the ability to bind with an epitope of *Burkholderia mallei, Burkholderia pseudomallei*, or *Burkholderia thailandensis*. The antibodies can be tested for their desired activity using the in vitro assays, or by analogous methods, after which their in vivo therapeutic and/or diagnostic activities can be confirmed and quantified according to known clinical testing methods.

In some forms, the antibody is a monoclonal antibody or a binding fragment thereof. A monoclonal antibody refers to an antibody where individual antibodies within a population are identical.

As used herein, the term "isolated antibody" refers to an antibody which is substantially free of other antibodies having different antigenic specificities (e.g., an isolated antibody that specifically binds to *B. mallei, B. pseudomallei*, or *B. thailandensis*, is substantially free of antibodies that specifically bind antigens other than *B. mallei, B. pseudomallei*, or *B. thailandensis*). An isolated antibody specifically binds to an epitope, isoform or variant of *B. mallei, B. pseudomallei*, or *B. thailandensis*. Moreover, an isolated antibody may be substantially free of other cellular material and/or chemicals.

As used herein, the terms "binding fragment," "antigen binding fragment," "antibody binding fragment," and the like, refer to one or more portions of an antibody that contain the antibody's CDRs and, optionally, the framework residues that comprise the antibody's "variable region" antigen recognition site, and exhibit an ability to immunospecifically bind antigen. Such fragments include Fab', F(ab')2, Fv, single chain (ScFv), etc., and mutants and variants thereof, naturally occurring variants.

As used herein, the term "fragment" refers to a peptide or polypeptide comprising an amino acid sequence of at least 5 contiguous amino acid residues, at least 10 contiguous amino acid residues, at least 15 contiguous amino acid residues, at least 20 contiguous amino acid residues, at least 25 contiguous amino acid residues, at least 40 contiguous amino acid residues, at least 50 contiguous amino acid residues, at least 60 contiguous amino residues, at least 70 contiguous amino acid residues, at least 80 contiguous amino acid residues, at least 90 contiguous amino acid residues, at least 100 contiguous amino acid residues, at least 125 contiguous amino acid residues, at least 150 contiguous amino acid residues, at least 175 contiguous amino acid residues, at least 200 contiguous amino acid residues, or at least 250 contiguous amino acid residues.

The variable regions can also be substituted and altered in ways that do not eliminate the binding and binding specificity of the variable region or CDRs. For the disclosed antibodies and polypeptides with substitutions, alterations, eliminations, etc. of portions of antibodies other than the variable regions (or other than the CDRs), it is preferred that the variable region sequences and the CDR sequences are, or are modeled after, the variable regions or CDRs of disclosed monoclonal antibody B5.

As used herein, the term "chimeric antibody" refers to a molecule in which different portions of the antibody are derived from different immunoglobulin molecules such as antibodies having a variable region derived from a non-human antibody and a human immunoglobulin constant region. Methods for producing chimeric antibodies are known in the art. See e.g., Morrison, 1985, Science 229: 1202; Oi et al., 1986, *BioTechniques* 4:214; Gillies et al., 1989, *J. Immunol. Methods* 125:191-202; and U.S. Pat. Nos. 6,311,415, 5,807,715, 4,816,567, and 4,816,397. Chimeric antibodies comprising one or more CDRs from a non-human species and framework regions from a human immunoglobulin molecule can be produced using a variety of techniques known in the art including, for example, CDR-grafting (EP 239,400; International Publication No. WO 91/09967; and U.S. Pat. Nos. 5,225,539, 5,530,101, and 5,585,089), veneering or resurfacing (EP 592,106; EP 519,596; Padlan, 1991, *Molecular Immunology* 28(4/5):489-498; Studnicka et al., 1994, *Protein Engineering* 7:805; and Roguska et al., 1994, Proc. Natl. Acad. Sci. USA 91:969), and chain shuffling (U.S. Pat. No. 5,565,332).

A chimeric antibody may be a "humanized antibody" (see, e.g., European Patent Nos. EP 239,400, EP 592,106, and EP 519,596; International Publication Nos. WO 91/09967 and WO 93/17105; U.S. Pat. Nos. 5,225,539, 5,530,101, 5,565,332, 5,585,089, 5,766,886, and 6,407,213; and Padlan, 1991, *Molecular Immunology* 28(4/5):489-498; Studnicka et al., 1994, *Protein Engineering* 7(6):805-814; Roguska et al., 1994, *PNAS* 91:969-973; Tan et al., 2002, *J. Immunol.* 169:1119-1125; Caldas et al., 2000, *Protein Eng.* 13:353-360; Morea et al., 2000, *Methods* 20:267-79; Baca et al., 1997, *J. Biol. Chem.* 272:10678-10684; Roguska et al., 1996, *Protein Eng.* 9:895-904; Couto et al., 1995, *Cancer Res.* 55 (23 Supp):5973s-5977s; Couto et al., 1995, *Cancer Res.* 55:1717-22; Sandhu, 1994, *Gene* 150:409-10; Pedersen et al., 1994, *J. Mol. Biol.* 235:959-973; Jones et al., 1986, *Nature* 321:522-525; Reichmann et al., 1988, *Nature* 332:323-329; and Presta, 1992, *Curr. Op. Struct. Biol.* 2:593-596).

As used herein, the term "humanized antibody" refers to an immunoglobulin comprising a human framework region and one or more CDR's from a non-human (usually a mouse or rat) immunoglobulin. The non-human immunoglobulin providing the CDR's is called the "donor" and the human immunoglobulin providing the framework is called the "acceptor." Constant regions need not be present, but if they are, they must be substantially identical to human immunoglobulin constant regions, i.e., at least about 85-90%, preferably about 95% or more identical. Hence, all parts of a humanized immunoglobulin, except possibly the CDR's, are substantially identical to corresponding parts of natural human immunoglobulin sequences. A humanized antibody is an antibody comprising a humanized light chain and a humanized heavy chain immunoglobulin. For example, a humanized antibody would not encompass a typical chimeric antibody, because, e.g., the entire variable region of a chimeric antibody is non-human. One says that the donor antibody has been "humanized," by the process of "humanization," because the resultant humanized antibody is expected to bind to the same antigen as the donor antibody that provides the CDR's. For the most part, humanized antibodies are human immunoglobulins (recipient antibody) in which hypervariable region residues of the recipient are replaced by hypervariable region residues from a non-human species (donor antibody) such as mouse, rat, rabbit or a non-human primate having the desired specificity, affinity, and capacity. In some instances, Framework Region (FR) residues of the human immunoglobulin are replaced by corresponding non-human residues. Furthermore, humanized antibodies may comprise residues which are not found in the recipient antibody or in the donor antibody. These modifications are made to further refine antibody performance. In general, the humanized antibody will comprise substantially all of at least one, and typically two, variable domains, in which all or substantially all of the hypervariable regions correspond to those of a non-human immunoglobulin and all or substantially all of the FRs are those of a human immunoglobulin sequence. The humanized antibody optionally also will comprise at least a portion of an immunoglobulin constant region (Fc), typically that of a human immunoglobulin that immunospecifically binds to an FcγRIIB polypeptide, that has been altered by the introduction of amino acid residue substitutions, deletions or additions (i.e., mutations).

DNA sequences coding for preferred human acceptor framework sequences include but are not limited to FR segments from the human germline VH segment VH1-18 and JH6 and the human germline VL segment VK-A26 and JK4. In a specific embodiment, one or more of the CDRs are inserted within framework regions using routine recombinant DNA techniques. The framework regions may be naturally occurring or consensus framework regions, and preferably human framework regions (see, e.g., Chothia et al., 1998, "Structural Determinants In The Sequences Of Immunoglobulin Variable Domain," J. Mol. Biol. 278: 457-479 for a listing of human framework regions).

As used herein, the terms "binding specificity," "specificity," "specifically reacts," "specifically interacts," or "specific to" refers to the ability of an antibody or other agent to detectably bind an epitope presented on an antigen, such as epitopes of B. mallei, B. pseudomallei, or B. thailandensis, while having relatively little detectable reactivity with other structures. Specificity can be relatively determined by binding or competitive assays, using e.g., Biacore instruments. Specificity can be exhibited by, e.g., an about 5:1, about 10:1, about 20:1, about 50:1, about 100:1, about 10,000:1 or greater ratio of affinity/avidity in binding to the specific antigen versus nonspecific binding to other irrelevant molecules. In the context of the disclosed antibodies and polypeptides, "bi-specific" and similar terms refer to antibodies or polypeptides containing at least two different specific binding elements that each specifically binds to a different epitope or ligand.

As used herein, the term "detect", "detecting", "determine" or "determining" generally refers to obtaining information. Detecting or determining can utilize any of a variety of techniques available to those skilled in the art, including for example specific techniques explicitly referred to herein. Detecting or determining may involve manipulation of a physical sample, consideration and/or manipulation of data or information, for example utilizing a computer or other processing unit adapted to perform a relevant analysis, and/or receiving relevant information and/or materials from a source. Detecting or determining may also mean comparing an obtained value to a known value, such as a known test value, a known control value, or a threshold value. Detecting or determining may also mean forming a conclusion based on the difference between the obtained value and the known value.

As used herein, the term "sensitivity" refers to the ability of a test to correctly identify true positives, i.e., subjects infected with B. mallei, B. pseudomallei, or B. thailandensis. For example, sensitivity can be expressed as a percentage, the proportion of actual positives which are correctly identified as such (e.g., the percentage of test subjects having B. mallei, B. pseudomallei, or B. thailandensis infection correctly identified by the test as having the infection). A test with high sensitivity has a low rate of false negatives, i.e., the cases of B. mallei, B. pseudomallei, or B. thailandensis infections not identified as such. Generally, the disclosed assays and methods have a sensitivity of at least 90%, at least 92%, at least 94%, at least 95%, at least 96%, at least 97%, at least 98%, at least 99%, or at least 100%.

As used herein, the term "specificity" refers to the ability of a test to correctly identify true negatives, i.e., the subjects that have no B. mallei, B. pseudomallei, or B. thailandensis infection. For example, specificity can be expressed as a percentage, the proportion of actual negatives which are correctly identified as such (e.g., the percentage of test subjects not having B. mallei, B. pseudomallei, or B. thailandensis infection correctly identified by the test as not having the infection). A test with high specificity has a low rate of false positives, i.e., the cases of individuals not having B. mallei, B. pseudomallei, or B. thailandensis infection but suggested by the test as having the infection. Generally, the disclosed methods have a specificity of at least 90%, at least 92%, at least 94%, at least 95%, at least 96%, at least 97%, at least 98%, at least 99%, or at least 100%.

As used herein, the term "accurate" refers to the ability of a test to provide a results with high sensitivity and high specificity, such as with sensitivity over about 80% and specificity over about 80%, with sensitivity over about 85% and specificity over about 85%, or with sensitivity over about 90% and specificity over about 90%.

As used herein, the term "sample" refers to body fluids, body smears, cell, tissue, organ or portion thereof that is isolated from a subject. A sample may be a single cell or a plurality of cells. A sample may be a specimen obtained by biopsy (e.g., surgical biopsy). A sample may be cells from a subject that are or have been placed in or adapted to tissue culture. A sample may be one or more of cells, tissue, serum, plasma, urine, spittle, sputum, and stool. A sample may be one or more of a saliva, sputum, tear, sweat, urine, exudate, blood, serum, plasma, or a vaginal discharge.

As used herein, the terms "subject," "individual" or "patient" refer to a human or a non-human mammal. A subject may be a non-human primate, domestic animal, farm animal, or a laboratory animal. For example, the subject may be a dog, cat, goat, horse, pig, mouse, rabbit, or the like. The subject may be a human. The subject may be healthy or suffering from or susceptible to a disease, disorder or condition. A patient refers to a subject afflicted with a disease or disorder. The term "patient" includes human and veterinary subjects.

A "control" sample or value refers to a sample that serves as a reference, usually a known reference, for comparison to a test sample. For example, a test sample can be taken from a test subject, and a control sample can be taken from a control subject, such as from a known normal (non-disease) individual. A control can also represent an average value gathered from a population of similar individuals, e.g., disease patients or healthy individuals with a similar medical background, same age, weight, etc. One of skill will recognize that controls can be designed for assessment of any number of parameters.

As used herein the terms "treatment" or "treating" refer to administering a composition to a subject or a system to treat one or more symptoms of a disease. The effect of the administration of the composition to the subject can be, but is not limited to, the cessation of a particular symptom of a condition, a reduction or prevention of the symptoms of a condition, a reduction in the severity of the condition, the complete ablation of the condition, a stabilization or delay of the development or progression of a particular event or characteristic, or minimization of the chances that a particular event or characteristic will occur.

As used herein the terms "effective amount" and "therapeutically effective amount," used interchangeably, as applied to the nanoparticles, therapeutic agents, and pharmaceutical compositions described herein, refer to the quantity necessary to render the desired therapeutic result. For example, an effective amount is a level effective to treat, cure, or alleviate the symptoms of a disease for which the composition and/or therapeutic agent, or pharmaceutical composition, is/are being administered. Amounts effective for the particular therapeutic goal sought will depend upon a variety of factors including the disease being treated and its severity and/or stage of development/progression; the bioavailability and activity of the specific compound and/or antineoplastic, or pharmaceutical composition, used; the route or method of administration and introduction site on the subject.

Recitation of ranges of values herein are merely intended to serve as a shorthand method of referring individually to each separate value falling within the range, unless otherwise indicated herein, and each separate value is incorporated into the specification as if it were individually recited herein.

Use of the term "about" is intended to describe values either above or below the stated value in a range of approx. +/−10%; in other forms the values may range in value either above or below the stated value in a range of approx. +/−5%; in other forms the values may range in value either above or below the stated value in a range of approx. +/−2%; in other forms the values may range in value either above or below the stated value in a range of approx. +/−1%.

II. Antibodies

A. Isolated Antibodies and Fragments

Native antibodies are usually heterotetrameric glycoproteins, composed of two identical light chains (LC) and two identical heavy chains (HC). LC Typically, each light chain is linked to a heavy chain by one covalent disulfide bond, while the number of disulfide linkages varies between the heavy chains of different immunoglobulin isotypes. Each heavy and light chain also has regularly spaced intrachain disulfide bridges. Each heavy chain has at one end a variable domain (V(H) or $V_H$) followed by a number of constant domains. Each light chain has a variable domain at one end (V(L) or $V_L$) and a constant domain at its other end; the constant domain of the light chain is aligned with the first constant domain of the heavy chain, and the light chain variable domain is aligned with the variable domain of the heavy chain. Particular amino acid residues are understood to form an interface between the light and heavy chain variable domains. The light chains of antibodies from any vertebrate species can be assigned to one of two clearly distinct types, called kappa (κ) and lambda (λ), based on the amino acid sequences of their constant domains. Depending on the amino acid sequence of the constant domain of their heavy chains, immunoglobulins can be assigned to different classes. There are five major classes of human immunoglobulins: IgA, IgD, IgE, IgG and IgM, and several of these may be further divided into subclasses (isotypes), e.g., IgG-1, IgG-2, IgG-3, and IgG-4; IgA-1 and IgA-2. One skilled in the art would recognize the comparable classes for mouse. The heavy chain constant domains that correspond to the different classes of immunoglobulins are called alpha, delta, epsilon, gamma, and mu, respectively.

In the context of antibodies and fragments thereof, the terms "variable region," "variable sequence," and the like, are used to describe certain portions of the variable domains that differ in sequence among antibodies and are used in the binding and specificity of each particular antibody for its particular antigen. However, the variability is not evenly distributed through the variable domains of antibodies. It is typically concentrated in three segments called complementarity determining regions (CDRs) or hypervariable (HV) regions both in the light chain and the heavy chain variable domains. The more highly conserved portions of the variable domains are called the framework (FR). The variable domains of native heavy and light chains each comprise four FR regions FR1, FR2, FR3, and FR4), largely adopting a β-sheet configuration, connected by three CDRs (HV1, HV2, HV3), which form loops connecting, and in some cases forming part of, the β-sheet structure. The CDRs in each chain are held together in close proximity by the FR regions and, with the CDRs from the other chain, contribute to the formation of the antigen binding site of antibodies (see Kabat E. A. et al., "Sequences of Proteins of Immunological Interest," National Institutes of Health, Bethesda, Md. (1987)). CRDs are typically at approximately residues 24-34 (L1), 50-56 (L2) and 89-97 (L3) in the light chain variable domain and at approximately residues 27-35 (H1), 50-65 (H2) and 95-102 (H3) in the heavy chain variable domain (Kabat et al., *Sequences of Proteins of Immunological Interest*, 5th Ed. Public Health Service, National Institutes of Health, Bethesda, MD (1991)). Residues that form core "hypervariable loops" are typically at approximately residues 26-32 (L1), 50-52 (L2) and 91-96 (L3) in the light chain variable domain and 26-32 (H1), 53-55 (H2) and 96-101 (H3) in the heavy chain variable domain (Chothia and Lesk, 1987, J. Mol. Biol. 196:901-917). The constant domains are not involved directly in binding an antibody to an antigen, but exhibit various effector functions, such as participation of the antibody in antibody-dependent cellular toxicity.

It is well-known that the variable regions of antibodies—and, in particular, the complementarity determining regions (CDRs) of the variable regions—are primarily responsible for the binding and binding specificity of antibodies. It is also well-known that portions of antibodies other than the variable regions (or other than the CDRs) can be substituted, altered, eliminated, etc. without abolishing the binding and binding specificity of the antibodies (or antibody fragments in the case of elimination of portions of the antibody). The well-known modular nature of antibody structure allows extensive substitution, alteration, elimination, etc. of portions of antibodies other than the variable regions (or other than the CDRs) while retaining the binding and binding specificity of the variable regions and CDRs. For example, the disclosed antibodies and antibody fragments can be in any form of antibody binding fragments that contains any one or all of the CDR sequences of the B5 antibody and any form of antibody binding fragments that contains the CDR sequences of the B5 antibody. Such principals have been amply demonstrated by production and use of chimeric antibodies, recombinant antibodies, humanized antibodies, and the numerous types of antibody fragments and antibody-derived polypeptides, such as F(ab')$_2$, fragment antigen-binding (Fab), half antibodies, single-chain variable fragments (scFv), VhH domain, V-NAR domain, $V_H$ domain, $V_L$ domain, F(ab)$_3$, bis-scFv, diabody, triabody, tetrabody, and minibody (Hollinger and Hudson, Nature Biotech. 23(9): 1126-1136 (2005)(and references cited therein), Holliger & Winter, Proc. Natl. Acad. Sci. USA 90, 6444-6448 (1993); Pei et al., Proc. Natl. Acad. Sci. USA 94, 9637-9642 (1997); Iliades et al., FEBS Lett. 409, 437-441 (1997); De Genst et al., J. Biol. Chem. 280, 14114-14121 (2005); De Genst et al., J. Biol. Chem. 279, 53593-53601 (2004); Dooley & Flajnik, Eur. J. Immunol. 35, 936-945 (2005); Streltsov & Nuttall, Immunol. Lett. 97, 159-160 (2005); Streltsov et al., Proc.

Natl. Acad. Sci. USA 101, 12444-12449 (2004); Cortez-Retamozo et al., Cancer Res. 64, 2853-2857 (2004); Dottorini et al., Biochemistry 43, 622-628 (2004); Colby et al., J. Mol. Biol. 342, 901-912 (2004); Jespers et al., J. Mol. Biol. 337, 893-903 (2004); Linsley, Nat. Immunol. 6, 231-232 (2005); 37. Casey et al., Br. J. Cancer 86, 1401-1410 (2002); Weir et al., Biochem. Soc. Trans. 30, 512-516 (2002); Dolezal et al., Protein Eng. 16, 47-56 (2003); Power et al., Methods Mol. Biol. 207, 335-350 (2003); Arndt et al., FEBS Lett. 578, 257-261 (2004); Griffiths et al., J. Nucl. Med. 45, 30-39 (2004); Olafsen et al., Protein Eng. Des. Sel. 17, 21-27 (2004); Wittel et al., Nucl. Med. Biol. 32, 157-164 (2005); Le Gall et al., Protein Eng. Des. Sel. 17, 357-366 (2004); Kenanova et al., Cancer Res. 65, 622-631 (2005); Adams et al., Cancer Res. 64, 6200-6206 (2004); Grosse-Hovest et al., Int. J. Cancer; published online 7 Jul. 2005 (interscience.wiley.com/cgi-bin/abstract/110559371/AB-STRACT 120); Holliger et al., Cancer Res. 59, 2909-2916 (1999); Pattersen et al., J. Comput. Chem. 25, 1605-1612 (2004); Olafsen et al., Cancer Res. 65, 5907-5916 (2005); Shen et al., J. Nucl. Med. 46, 642-651 (2005); Nellis et al., Biotechnol. Prog. 21, 221-232 (2005); Ebbinghaus et al., Int. J. Cancer 116, 304-313 (2005); Wong et al., Clin. Cancer Res. 10, 5014-5021 (2004); Hulstein et al., Blood; published online 12 Jul. 2005 (bloodjournal.org/cgi/reprint/2005-03-1153v1)).

1. Antibody Fragments

Forms of the disclosed antibodies use the binding fragments of a B5 monoclonal antibody specific to *B. mallei, B. pseudomallei*, or *B. thailandensis* (referred to here in as "B5 antibody") produced from the B5 hybridoma cell line as deposited. For antibody forms of the disclosed antibodies and polypeptides, the other antibody regions can be substituted, altered, or both, with or from any heavy and light chains or portions thereof, with the expectation that the bi-specific binding and binding specificity for the *B. mallei* LPS will be retained. For antibody fragment and peptide forms, the binding fragment specific to *B. mallei* LPS can be embodied by any of numerous binding fragment forms and can be linked in any suitable way, including in any of the multivalent and multi-specific ways used for antibody binding fragments. In the case of the disclosed antibodies, antibody fragments, and polypeptides, such forms will be bi-specific instead of (or in addition to) multivalent. Examples of binding fragment forms include $F(ab')_2$, fragment antigen-binding (Fab), half antibodies, single-chain variable fragments (scFv), VhH domain, V-NAR domain, $V_H$ domain, $V_L$ domain, $F(ab)_3$, bis-scFv, diabody, triabody, tetrabody, and minibody. Any of these forms can be independently used to embody the binding fragment specific to *B. mallei* LPS and then can be combined or joined using any suitable linker or coupling. The binding fragment specific to *B. mallei* LPS can also each be used as a binding fragment portion of a multivalent and/or multi-specific form of antibody fragments. Examples include $F(ab')_2$, $F(ab)_3$, bis-scFv, diabody, triabody, tetrabody, and minibody.

The kits, assays, and methods use *B. mallei* as the exemplary organism to demonstrate the use of the B5 antibody in compositions, kits, assays, and methods that can detect *B. mallei, B. pseudomallei*, or *B. thailandensis* and protect against infections with *B. mallei, B. pseudomallei*, or *B. thailandensis*.

2. Chimeric Antibodies

The disclosure encompasses chimeric antibodies and hybrid antibodies, with dual or multiple antigen or epitope specificities, and fragments, such as F(ab')2 and the like, including hybrid fragments. Such antibodies and fragments can be made by techniques known in the art and can be screened for specificity and activity according to general methods for producing antibodies and screening antibodies for specificity and activity (see, e.g., Harlow and Lane. Antibodies, A Laboratory Manual. Cold Spring Harbor Publications, New York, (1988), which is hereby incorporated by reference).

The disclosure also encompasses human antibodies and/or humanized antibodies. Many non-human antibodies (e.g., those derived from mice, rats, or rabbits) are naturally antigenic in humans and, thus, can give rise to undesirable immune responses when administered to humans. Therefore, the use of human or humanized antibodies in the methods described herein serves to lessen the chance that an antibody administered to a human will evoke an undesirable immune response.

3. Human Antibodies

Human, chimeric, or humanized derivatives of the B5 antibody are particularly preferred for in vivo use in humans, however, murine antibodies or antibodies of other species may be advantageously employed for many uses (for example, in vitro or in situ detection assays, acute in vivo use, etc.). A humanized antibody can comprise amino acid residue substitutions, deletions or additions in one or more non-human CDRs. The humanized antibody derivative may have substantially the same binding, stronger binding or weaker binding when compared to a non-derivative humanized antibody. In specific forms, one, two, three, four, or five amino acid residues of the CDR have been substituted, deleted or added (i.e., mutated). Completely human antibodies are particularly desirable for therapeutic treatment of human subjects.

Human antibodies can be made by a variety of methods known in the art including phage display methods described above using antibody libraries derived from human immunoglobulin sequences (see U.S. Pat. Nos. 4,444,887 and 4,716,111; and International Publication Nos. WO 98/46645, WO 98/50433, WO 98/24893, WO 98/16654, WO 96/34096, WO 96/33735, and WO 91/10741). Human antibodies can be produced using transgenic mice which are incapable of expressing functional endogenous immunoglobulins, but which can express human immunoglobulin genes. For example, the human heavy and light chain immunoglobulin gene complexes may be introduced randomly or by homologous recombination into mouse embryonic stem cells. Alternatively, the human variable region, constant region, and diversity region may be introduced into mouse embryonic stem cells in addition to the human heavy and light chain genes. The mouse heavy and light chain immunoglobulin genes may be rendered non-functional separately or simultaneously with the introduction of human immunoglobulin loci by homologous recombination. In particular, homozygous deletion of the JH region prevents endogenous antibody production. The modified embryonic stem cells are expanded and microinjected into blastocysts to produce chimeric mice. The chimeric mice are then bred to produce homozygous offspring which express human antibodies. The transgenic mice are immunized using conventional methodologies with a selected antigen, e.g., purified *B. mallei* LPS. Monoclonal antibodies directed against the antigen can be obtained from the immunized, transgenic mice using conventional hybridoma technology (see, e.g., U.S. Pat. No. 5,916,771 and Yokoyama W M. Production of monoclonal antibody supernatant and ascites fluid. Curr Protoc Mol Biol Chapter 11:Unit 11.10; 2008). The human immunoglobulin transgenes harbored by the transgenic mice rearrange during B cell differentiation, and subsequently undergo class switching and somatic mutation. Thus, using such a technique, it is possible to produce therapeutically useful IgG, IgA, IgM and IgE antibodies. For an overview of this technology for producing human antibodies, see Lonberg and Huszar (1995, Int. Rev. Immunol. 13:65-93). For a detailed discussion of this technology for producing human antibodies and human monoclonal antibodies and protocols for producing such antibodies, see, e.g., International Publication Nos. WO 98/24893, WO 96/34096, and WO 96/33735; and U.S. Pat. Nos. 5,413,923, 5,625,126, 5,633,425, 5,569,825, 5,661,016, 5,545,806, 5,814,318, and 5,939,598. In addition, companies such as Abgenix, Inc. (Freemont, CA) and Bristol Myers Squibb (New York, NY) can be engaged to provide human antibodies directed against a selected antigen using technology similar to that described above.

4. Humanized Antibodies

A humanized or chimeric version of the B5 antibody can include substantially all of at least one, and typically two, variable domains in which all or substantially all of the CDR regions correspond to those of a non-human immunoglobulin (i.e., donor antibody) and all or substantially all of the framework regions are those of a human immunoglobulin consensus sequence. Preferably, the antibody also includes at least a portion of an immunoglobulin constant region (Fc), typically that of a human immunoglobulin. The constant domains of the antibodies may be selected with respect to the proposed function of the antibody, in particular the effector function which may be required. In some forms, the constant domains of the antibodies are (or comprise) human IgA, IgD, IgE, IgG or IgM domains. In a specific embodiment, human IgG constant domains, especially of the IgG1 and IgG3 isotypes are used, when the humanized antibodies is intended for therapeutic uses and antibody effector functions such as antibody-dependent cell-mediated cytotoxicity (ADCC) and complement-dependent cytotoxicity (CDC) activity are needed. In alternative forms, IgG2 and IgG4 isotypes are used when the antibody is intended for therapeutic purposes and antibody effector function is not required. Disclosed are also antibodies with the Fc constant domains comprising one or more amino acid modifications which alter antibody effector functions such as those disclosed in U.S. Patent Application Publication Nos. 2005/0037000 and 2005/0064514.

In some forms, the antibody contains both the light chain as well as at least the variable domain of a heavy chain. In other forms, the antibody may further include one or more of the CH1, hinge, CH2, CH3, and CH4 regions of the heavy chain. The antibody can be selected from any class of immunoglobulins, including IgM, IgG, IgD, IgA and IgE, and any isotype, including IgG1, IgG2, IgG3 and IgG4. In some forms, the constant domain is a complement fixing constant domain where it is desired that the antibody exhibit cytotoxic activity, and the class is typically IgG1. In other forms, where such cytotoxic activity is not desirable, the constant domain may be of the IgG2 class. The antibody may comprise sequences from more than one class or isotype, and selecting particular constant domains to optimize desired effector functions is within the ordinary skill in the art.

The framework and CDR regions of a humanized antibody need not correspond precisely to the parental sequences, e.g., the donor CDR or the consensus framework may be mutagenized by substitution, insertion or deletion of at least one residue so that the CDR or framework residue at that site does not correspond to either the consensus or the donor antibody. Such mutations, however, are preferably not extensive. Usually, at least 75% of the humanized antibody residues will correspond to those of the parental framework region (FR) and CDR sequences, more often 90%, and most preferably greater than 95%. Humanized antibodies can be produced using variety of techniques known in the art, including, but not limited to, CDR-grafting (European Patent No. EP 239,400; International Publication No. WO 91/09967; and U.S. Pat. Nos. 5,225,539, 5,530,101, and 5,585,089), veneering or resurfacing (European Patent Nos. EP 592,106 and EP 519,596; Padlan, 1991, *Molecular Immunology* 28(4/5):489-498; Studnicka et al., 1994, *Protein Engineering* 7(6):805-814; and Roguska et al., 1994, *Proc. Natl. Acad. Sci.* 91:969-973), chain shuffling (U.S. Pat. No. 5,565,332), and techniques disclosed in, e.g., U.S. Pat. Nos. 6,407,213, 5,766,886, 5,585,089, International Publication No. WO 9317105, Tan et al., 2002, *J. Immunol.* 169:1119-25, Caldas et al., 2000, *Protein Eng.* 13:353-60, Morea et al., 2000, *Methods* 20:267-79, Baca et al., 1997, *J. Biol. Chem.* 272:10678-84, Roguska et al., 1996, *Protein Eng.* 9:895-904, Couto et al., 1995, *Cancer Res.* 55 (23 Supp):5973s-5977s, Couto et al., 1995, *Cancer Res.* 55:1717-22, Sandhu, 1994, *Gene* 150:409-10, Pedersen et al., 1994, *J. Mol. Biol.* 235:959-73, Jones et al., 1986, *Nature* 321:522-525, Riechmann et al., 1988, *Nature* 332:323, and Presta, 1992, *Curr. Op. Struct. Biol.* 2:593-596. Often, framework residues in the framework regions will be substituted with the corresponding residue from the CDR donor antibody to alter, preferably improve, antigen binding. These framework substitutions are identified by methods well known in the art, e.g., by modeling of the interactions of the CDR and framework residues to identify framework residues important for antigen binding and sequence comparison to identify unusual framework residues at particular positions. (See, e.g., Queen et al., U.S. Pat. No. 5,585,089; U.S. Publication Nos. 2004/0049014 and 2003/0229208; U.S. Pat. Nos. 6,350,861; 6,180,370; 5,693,762; 5,693,761; 5,585,089; and 5,530,101 and Riechmann et al., 1988, *Nature* 332:323).

B. Antibodies to *B. mallei*, *B. pseudomallei*, or *B. thailandensis*

Described are isolated binding fragments, isolated antibody fragments, isolated monoclonal antibodies, isolated chimeric antibodies, and isolated humanized antibodies having a binding specificity to *B. mallei*, *B. pseudomallei*, or *B. thailandensis*.

Typically, the isolated binding fragments, isolated antibody fragments, isolated monoclonal antibodies, isolated chimeric antibodies, or the isolated humanized antibodies fragment have an amino acid sequence, in an N- to C-direction, of the following structural domains:

N-FR1-CDR1-FR2-CDR2-FR3-CDR3-FR4-C            Formula I

In Formula I, the FR denotes a framework region amino acid sequence and CDR denotes a complementary determining region. At least the amino acid sequence of the one or more CDR1, CDR2, or CDR3 is that of the CDR1, CDR2, or CDR3 of the monoclonal antibody produced from the B5 hybridoma cell line as deposited.

The monoclonal antibody produced from the B5 hybridoma cell line as deposited is referred to here in as "B5 antibody". The isolated binding fragments, isolated antibody fragments, isolated monoclonal antibodies, isolated chimeric antibodies, and isolated humanized antibodies having the one or more CDR1, CDR2, or CDR3 of the same amino acid sequence as the CDR1, CDR2, or CDR3 of the B5 antibody may be referred to herein as isolated B5 antibody fragments, isolated B5 monoclonal antibodies, isolated B5 chimeric antibodies, and isolated B5 humanized antibodies, respectively.

Typically, the isolated B5 antibody fragments, isolated B5 monoclonal antibodies, isolated B5 chimeric antibodies, and isolated B5 humanized antibodies have a high binding specificity to the purified *B. mallei* LPS. They detectably bind the purified LPS of *B. mallei, B. pseudomallei*, or *B. thailandensis*, while having relatively little detectable reactivity with other proteins or structures, in an in vitro binding assay. The specificity may be relatively determined by binding or competitive assays, using e.g., Biacore instruments, or in vitro Enzyme Linked Immunosorbent Assay (ELISA). Specificity can be exhibited by, e.g., an about 10:1, about 20:1, about 50:1, about 100:1, about 10,000:1 or greater ratio of affinity/avidity in binding to the specific antigen versus nonspecific binding to other irrelevant molecules. For example, a relative binding specificity for the B5 antibody fragment may be presented as a binding to purified *B. mallei* LPS, purified *B. pseudomallei* LPS, or purified *B. thailandensis* LPS producing a detection signal that is at least two times over the detection signal from binding to the same amount of an unrelated antigen, such as bovine serum albumin. In an ELISA to a purified *B. mallei* LPS at 0.5 ng or to bovine serum albumin (BSA) at 0.5 ng, the ratio of the detection signal from binding to *B. mallei* LPS at 0.5 ng to a detection signal from binding to BSA at 0.5 ng may be between about 2:1, about 5:1, about 6:1, about 7:1, about 8:1, about 9:1, about 10:1, about 15:1, about 20:1, or more, when the B5 antibody fragments, isolated B5 monoclonal antibodies, isolated B5 chimeric antibodies, and isolated B5 humanized antibodies are used in the assay at a concentration between about 1 ng/µl and 10 ng/µl.

To assay the specificity of the B5 antibody fragments, isolated B5 monoclonal antibodies, isolated B5 chimeric antibodies, and isolated B5 humanized antibodies, these may be used at a concentration between about 1 ng/µl and 10 ng/µl, such as about 1 ng/µl, about 1.5 ng/µl, about 1.75 ng/µl, about 2 ng/µl, about 2.5 ng/µl, about 3 ng/µl, about 3.5 ng/µl, about 4 ng/µl, about 4.5 ng/µl, about 5 ng/µl, about 5.5 ng/µl, about 6 ng/µl, about 6.5 ng/µl, about 7 ng/µl, about, 7.5 ng/µl, about 8 ng/µl, about 8.5 ng/µl, about 9 ng/µl, about 9.5 ng/µl, or about 10 ng/µl. Preferably, the concentration between about 1 ng/µl and 5 ng/µl, such as about 2 ng/µl, about 3 ng/µl, about 3.5 ng/µl, or about 4 ng/µl.

Figure 2:
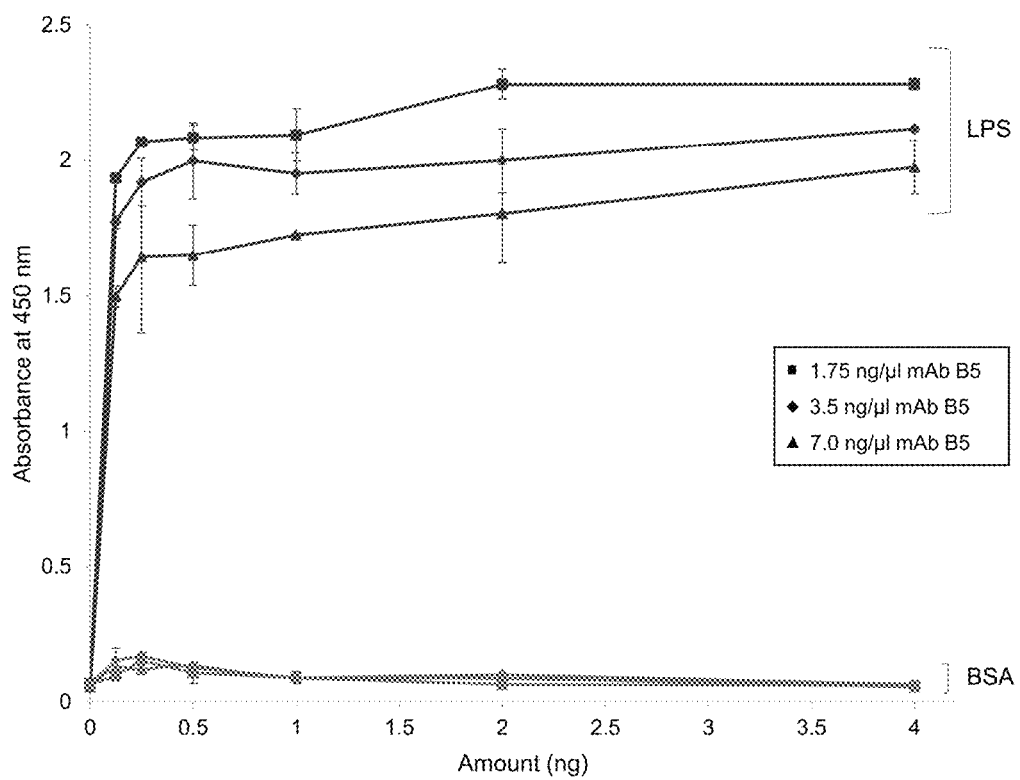
FIG. 2 is a graph showing the specificity of the mouse monoclonal anti-LPS antibody (mAb) B5 at different concentrations (1.75, 3.5, and 7.0 ng/μL) against various amounts of *B. mallei* LPS or bovine serum albumin (BSA), tested using indirect ELISA.

An exemplary ELISA assay for the specificity of an isolated B5 monoclonal antibody is described in the Examples and the result is shown in FIG. 2.

C. B5 Hybridoma

Described is also a hybridoma cell line producing the B5 antibody. The hybridoma cell line is denoted as B5 hybridoma or B5 hybridoma cell line.

The B5 hybridoma encodes and produces the B5 antibody. The B5 hybridoma was established after immunizing laboratory mice with the antigen—purified LPS from *B. mallei*, as described in the Examples. The B5 hybridoma was produced by the method of Yokoyama W M. Production of monoclonal antibody supernatant and ascites fluid. *Curr Protoc Mol Biol*. Chapter 11:Unit 11.10; 2008, as described in the Examples.

The monoclonal antibodies produced from the B5 hybridoma cell line as deposited were screened for isotype and for binding to the purified LPS from *B. mallei*. The B5 hybridoma cell line as deposited produces the B5 antibody, which has the subclass IgG2b with λ light chains. The B5 antibody has high binding specificity to the purified LPS from *B. mallei*. The binding specificity of 1.75 ng/µl of the B5 antibody, as measured by the ratio of the detection signal from binding to 0.5 ng *B. mallei* LPS to the detection signal from binding to 0.5 ng BSA in an ELISA, is over 2:1, and ranged between 5:1 and 20:1.

III. Test Kits

The disclosed monoclonal antibodies (i.e. "B5 antibody") or the isolated binding fragments, antibody fragments, isolated chimeric antibodies, or isolated humanized antibodies derived therefrom, or a combination thereof, (collectively referred to herein as "B5 binding component") can be used in any suitable test kits for the detection of *B. mallei, B. pseudomallei*, or *B. thailandensis* antibodies in a test sample. Exemplary test kits containing the B5 binding component include, but are not limited to, kits for immunoassays, including kits for immunocytochemistry, immunohistochemistry, Western blotting, diagnostic assays, enzyme-linked immunosorbent assays ("ELISA"), including high-throughput ELISA assays, and competitive ELISA (also referred to as "cELISA"). The kits, assays, and methods use *B. mallei* as the exemplary organism to demonstrate the use of the B5 binding component in compositions, kits, assays, and methods that can detect *B. mallei, B. pseudomallei*, or *B. thailandensis* and protect against infections with *B. mallei, B. pseudomallei*, or *B. thailandensis*.

The term "test kit" refers to an assembly of different components, which are packaged together for use in performing an assay. The kits may provide one, two, three, or more components to complete the assay by the end user. The kits may provide all the components to complete the assay by the end user.

For cELISA, the kits are useful for detecting the presence, absence, and/or the concentration of *B. mallei* antibodies in a test sample. Each of the components can be provided in a separate vial or container (e.g. an ampule, a bottle, a test tube, a flask, a syringe, or an envelope), in a liquid form or a solid form, such as powders. Alternatively, some of components can be provided in the same vial or container, in a liquid form or a solid form, and the other components can be provided in separate vials or containers. The amounts, concentrations, and volumes of reagents, buffers, and other materials provided in the test kit can be selected to provide desired results for a particular assay.

A. Components in Test Kits

The test kit described herein includes the disclosed B5 binding component and an antigen, such as *B. mallei* lipopolysaccharide (also referred to as "LPS").

The *B. mallei* LPS can be extracted and purified from a variety of *B. mallei* strains. For example, the *B. mallei* LPS is extracted and purified from *B. mallei* strain MB1731.

Each of the antigen and the B5 binding component can be in the form of a liquid or a solid (e.g. powders), and optionally is provided in a vial or another container. For example, the *B. mallei* LPS is in the form of powders or a liquid and provided in a first vial and the B5 binding component is in the form of powders or a liquid and provided in a second vial; the two vials are packaged together in the test kit.

The test kits may further includes a solid support, one or more reagents, one or more buffers, one or more reference materials, or an instruction for use, or a combination thereof. These components can be packaged together in one container with the B5 antibody and the antigen, or in a separate container from the B5 binding component and the antigen. Packaging of multiple components of a test kit is known, as described for kits by ThermoFisher Scientific® for ELISA kits and in U.S. Pat. No. 10,344,098.

1. Solid Support

The test kit can further include a solid support, such as a vessel, supporting the antigen-antibody binding being tested. The vessel may be a cuvette, a tube, a capsule, a microtiter plate with microtiter wells, such as a 24-well plate, 96-well plate, 192-well plate a 384 well-plate, or a surface on particles. The solid support can be formed from any suitable polymeric materials, such as polystyrene or polyvinyl, or a derivative thereof.

The solid support can be uncoated or pre-coated with the antigen. For example, the antigen can be provided in a solid form, immobilized on a surface of the solid support to form a reaction region. When the solid support is a plate, the plate can contain a plurality of microtiter wells (also referred to as "microwell plate"), such as a 48-, 96-, or 192-microwell plate; the antigen can be immobilized on a surface of the plate inside each microtiter well to form a reaction region inside each microtiter well.

In some forms, the plate can contain an inlet and a first channel or a first set of channels, where the first channel or first set of channels is configured to allow a solution to flow from the inlet to the reaction region. For example, the test kit contains a microwell plate pre-coated with *B. mallei* LPS; a test sample is added into the inlet, flows through a channel and into a microtiter well, and contacts the antigen in the reaction region.

In some forms, the plate can further contain a second channel or a second set of channels, where the second channel or second set of channels is configured to allow a solution to flow from the reaction region to the outlet. For example, the test sample that flows to the microtiter well and contacts the antigen in the reaction region can then flow through another channel and into the outlet.

2. Reagents

The test kit can further include one or more reagents for performing an assay for the detection of *B. mallei* antibodies in a test sample. Exemplary reagents that can be included in the test kit include, but are not limited to, a second antibody-detection label conjugate (also referred to as "conjugate"), a biotinylated second antibody, an avidin-conjugated detection label, a substrate, and a stop solution, and a combination thereof.

In some forms, the test kit can further contain a biotinylated second antibody, an avidin-conjugated detection label, a substrate, or a stop solution, or a combination thereof. For example, the test kit further contains a biotinylated second antibody, an avidin-conjugated detection label, a substrate, and optionally a stop solution.

In some forms, the test kit can further contain a conjugate, a substrate, or a stop solution, or a combination thereof. For example, the test kit further contains a conjugate, a substrate, and optionally a stop solution The second antibody of the conjugate or the biotinylated second antibody can bind to the B5 binding component. The detection label of the conjugate or the avidin-conjugated detection label can be an enzyme (e.g. horseradish peroxidase (HRP), alkaline phosphatase (AP), etc.) or a fluorescent tag.

When the detection label is an enzyme, the enzyme can react with a suitable substrate to generate a signal, such as an optical signal or an electrochemical signal. Exemplary substrates that can be included in the test kit to react with an enzyme for signal generation include, but are not limited to, colometric substrates (e.g. 3,3',5,5'-tetramethylbenzidine ("TMB"), 2,2'-Azinobis [3-ethylbenzothiazoline-6-sulfonic acid]-diammonium salt ("ABTS"), o-phenylenediamine dihydrochloride ("OPD"), p-Nitrophenyl Phosphate ("PNPP"), o-nitrophenyl-β-D-galactopyranoside ("ONPG"), etc.); chemiluminescent substrates (e.g. 1,2-dioxetane alkaline phosphatase substrates such as CSPD™ and CDP-Star™, SuperSignal™ ELISA Pico Chemiluminescent Substrate, SuperSignal™ ELISA Femto Substrate, DynaLight™ Substrate with RapidGlow™ Enhancer, etc.); and fluorescent substrates (e.g. quantaBlu™ Fluorogenic Peroxidase Substrate, QuantaBlu™ NS/K Fluorogenic Substrate, QuantaRed™ Enhanced Chemifluorescent HRP Substrate, Amplex™ Red, and Amplex™ UltraRed, etc.). For example, the detection label of the conjugate or the avidin-conjugated detection label is HRP and the substrate is TMB. The reaction between HRP and TMB can form a blue reaction product, generating an optical signal that can be measured at about 605 nm.

The term "stop solution" refers to a solution that contains a chemical agent at a suitable concentration to terminate the reaction between the enzyme of the conjugate and the substrate. For example, when the conjugate is an IgG-HRP conjugate and the substrate is tetramethylbenzidine ("TMB"), a sulfuric acid solution having a concentration of about 0.3 M is included in the test kit for use as a stop solution to terminate the HRP/TMB reaction. Upon termination, the blue reaction product turns yellow, generating an optical signal that can be measured at about 450 nm.

Typically, each of the reagents included in the test kit is provided separately in a vial or another container. For example, the test kit includes a conjugate provided in a first vial or container, a substrate provided in a second vial or container, and a stop solution provided in a third vial or container, where each of the conjugate and substrate is in the form of a solid or a liquid.

3. Buffer Solutions

The test kit can further include one or more buffer solutions for use in an assay for the detection of *B. mallei* antibodies in a test sample. Exemplary buffer solutions that can be included in the test kit include, but are not limited to, blocking buffers, dilution buffers (e.g. sample dilution buffers, enzyme dilution buffers, etc.), and wash buffers, and a combination thereof. Alternatively, the components of a buffer solution are provided in a solid form in the test kit and a user will prepare the buffer solution using the provided solid components.

The term "blocking buffer" refers to a buffer solution containing a blocking agent, such as a protein irrelevant to the antigen (e.g. albumin, gelatin, and casein) or a non-protein blocking compound, that passively adsorbs to the remaining surfaces of the solid support that are not occupied by the antigen. The blocking buffer may also contain one or more salts and optionally contains sugars (e.g. sucrose, lactose, and maltose), preservative (e.g. thimerosal), or surfactants (e.g. Tween 20 and Triton X-100), or a combination thereof, where each component is at a suitable concentration.

Exemplary salts for preparing the blocking buffer include, but are not limited to, sodium phosphate, potassium phosphate, sodium chloride, potassium chloride, sodium acetate, potassium acetate, sodium citrate, potassium citrate, sodium succinate, potassium succinate, ammonium bicarbonate, ammonium carbonate, tris(hydroxymethyl)aminomethane (also referred to as "Tris"), and a combination thereof. For example, the blocking buffer included in the test kit contains Tris-base, gelatin, sucrose, thimerosal, casein, and Tween 20.

In some forms, each component of the blocking buffer is provided in a solid form in a separate vial or container in the test kit and a user will combine the components and prepare the blocking buffer using the provided solid components. Alternatively, some or all of the components of the blocking buffer are provided in a solid form in one vial or container in the test kit and a user will prepare the blocking buffer using the provided solid components. The specific concentration/amount of each component will vary depending on the specific assay being performed. A more specific exemplary blocking buffer is described in the Examples below.

The term "sample dilution buffer" refers to a buffer solution for dissolving the antigen and/or B5 binding component in a solid form or diluting the antigen and/or B5 binding component in a liquid form, and/or diluting a biological sample to form the test sample. The term "enzyme dilution buffer" refers to a buffer solution for dissolving the conjugate in a solid form or diluting the conjugate in a liquid form. Typically, each of the sample dilution buffer and enzyme dilution buffer contains one or more salts and optionally contains a serum albumin and/or a surfactant, where each component is at a suitable concentration. Any of the above-described exemplary salts for the blocking buffer can be used for preparing the dilution buffers. For example, each of the sample dilution buffer and enzyme dilution buffer included in the test kit contains PBS, BSA, and Tween 20; however, the concentrations of the BSA and Tween 20 in the sample dilution buffer are different from the enzyme dilution buffer. In some forms, the components of the sample and/or enzyme dilution buffers can be provided in a solid form as described above for the blocking buffer. The specific concentration/amount of each component will vary depending on the specific assay being performed. More specific exemplary sample dilution buffer and enzyme dilution buffer are described in the Examples below.

The term "wash buffer" refers to a buffer solution for washing the solid support to remove any unbound B5 binding component and/or unbound conjugate. Typically, the wash buffer contains one or more salts and optionally contains a surfactant, where each component is at a suitable concentration. Any of the above-described exemplary salts for the blocking buffer can be used for preparing the wash buffer. For example, the wash buffer included in the test kit contains PBST, PBS, and Tween 20. In some forms, the components of the wash buffer can be provided in a solid form as described above for the blocking buffer. The specific concentration of each component will vary depending on the specific assay being performed. A more specific exemplary wash buffer is described in the Examples below.

Typically, each of the buffer solutions included in the test kit is provided separately in a vial or other containers. In some forms, a buffer solution can be provided in the same vial or container as the B5 binding component, the antigen, or a reagent. For example, a sample dilution buffer is provided in the same vial as the mAb and/or an enzyme dilution buffer is provided in the same vial as the conjugate.

4. Reference Materials

The test kit can further include a reference material, optionally more than one reference material. The term "reference material" refers to a material that contains a known amount of the B. mallei antibodies to serve as a standard to ensure the quality of an assay.

For example, the test kit includes a first reference material containing a certain amount of B. mallei antibodies that will serve as a positive standard for an assay and/or a second reference material not containing B. mallei antibodies that will serve as a negative standard for the same assay.

Alternatively, the test kit can include a series of reference materials containing different known amounts of the B. mallei antibodies such that a standard calibration curve can be prepared; the concentration of B. mallei antibodies in a test sample can be calculated by comparing its signal with the calibration curve.

The reference material or each reference material of two or more reference materials included in the test kit is provided in a vial or container.

5. Instructions for Use

The test kit may include an instruction for use. The instruction for use may be printed on paper and/or supplied in an electronically-readable medium. Alternatively, the instruction for use may be provided by directing a user to an internet website as specified by the manufacturer or distributor of the test kit and/or via electronic mail.

B. Exemplary Test Kits

An exemplary test kit is a cELISA kit for detecting the presence, absence, and/or the concentration of B. mallei antibodies in a test sample.

The cELISA kit can include a B. mallei LPS (e.g. B. mallei LPS extracted and purified from B. mallei strain MB1731) and the disclosed B5 antibody, and optionally a plate containing a plurality of microtiter wells (e.g. a 48-, 96-, or 192-microwell plate). The B5 antibody can bind to the B. mallei LPS and generate a signal. If the test sample contains B. mallei antibodies, they will compete with the B5 binding component for the epitope and inhibit binding of B5 antibody to the B. mallei LPS. This inhibition results in a decrease of generated signal.

Each of the B. mallei LPS and B5 antibody can be in the form of a solid or a liquid. In some forms, each of the B. mallei LPS and B5 antibody is in a solid form and provided in a separate vial or container. In some forms, each of the B. mallei LPS and B5 antibody is in a liquid form and provided in a separate vial or container. In some forms, the B. mallei LPS is in a solid form and provided in a first vial or container and the B5 antibody is in a liquid form and provided in a second vial or container. In some forms, the B. mallei LPS is in a liquid form and provided in a first vial or container and the B5 antibody is in a solid form and provided in a second vial or container.

In some forms, the cELISA kit can include a B. mallei LPS, the disclosed B5 binding component (e.g. a B5 antibody), and a microwell plate. In these forms, the B. mallei LPS can be in a solid form, immobilized on a surface of the plate inside each microtiter well, forming a reaction region inside each microtiter well; the B5 binding component (e.g. the B5 antibody) can be in a solid or a liquid form and provided in a vial or container.

The cELISA can further include one or more reagents, one or more buffers, one or more reference materials, or an instruction for use, or a combination thereof, as described above.

In some forms, the cELISA includes a microwell plate, a B. mallei LPS, the disclosed B5 binding component (e.g. a B5 antibody), and one or more reagents such as a conjugate, a substrate, and/or a stop solution. Each of the B. mallei LPS, B5 binding component (e.g. the B5 antibody), and reagents is in the form of a solid or a liquid, which can be provided in a vial or container as a separate component.

In some forms, the cELISA includes a microwell plate; a B. mallei LPS; the disclosed B5 binding component (e.g. a B5 antibody); one or more reagents such as a conjugate, a substrate, and/or a stop solution; and one or more buffer solutions or components of one or more buffers in a solid form. Each of the B. mallei LPS, B5 binding component (e.g. the B5 antibody), and reagents is in the form of a solid or a liquid, which can be provided in a vial or container as a separate component; each buffer solution or components of a buffer in a solid form can be provided in the same vial or container as the *B. mallei* LPS, mAb, or a reagent, or separately in a vial or container.

In some forms, the cELISA includes a microwell plate; a *B. mallei* LPS; the disclosed B5 binding component (e.g. a B5 antibody); one or more reagents such as a conjugate, a substrate, and/or a stop solution; one or more buffer solutions or components of one or more buffers in a solid form; and one or more reference materials. Each of the *B. mallei* LPS, B5 binding component (e.g. the B5 antibody), reagents, and reference materials is in the form of a solid or a liquid, which can be provided in a vial or container as a separate component; each buffer solution or components of a buffer in a solid form can be provided in the same vial or container as the *B. mallei* LPS, B5 binding component (e.g. the B5 antibody), a reagent, or a reference material, or in a vial or container as a separate component.

For example, the cELISA includes a microwell plate pre-coated with *B. mallei* LPS in a solid form inside each microtiter well; the B5 antibody provided in a vial or container; one or more reagents including a conjugate, a substrate, and a stop solution, where each reagent is provided in a vial or container as a separate component; one or more buffer solutions including a blocking buffer, a sample dilution buffer, an enzyme dilution buffer, and a wash buffer, or components of these buffers in a solid form, where each buffer or components of each buffer in a solid form is provided in the same vial or container as the *B. mallei* LPS, B5 antibody, or a reagent, or in a vial or container as a separate component; one or more reference materials, where each reference material is provided in a vial or container; and an instruction for use provided in a printed form or an electronic form.

A more specific exemplary cELISA kit is described in the Examples below.

IV. Methods of Use

The isolated monoclonal antibodies (i.e. B5 antibody), and the isolated binding fragments, isolated antibody fragments, isolated chimeric antibodies, and isolated humanized antibodies derived therefrom having a binding specificity to *B. mallei, B. pseudomallei*, or *B. thailandensis* (collectively referred to herein as "B5 binding component") may be used in detection of the pathogen or treating diseases of the pathogen.

The detection may be direct, such as directly detecting molecules specific to the pathogen in samples from subjects, or it may be an indirect detection, such as detecting effector proteins raised by the subject against the pathogen. The methods for detecting the pathogen may include detecting *B. mallei, B. pseudomallei*, or *B. thailandensis* LPS in a sample from a subject. The methods for detecting the pathogen, or an infection by the pathogen, may include methods for detecting a presence of antibodies raised by the subject against *B. mallei, B. pseudomallei*, or *B. thailandensis*. These methods are further described below.

In some forms, the disclosed B5 binding component (e.g. a B5 antibody) can be used to test the presence, absence, and/or the concentration of *B. mallei* antibody in a test sample using a test kit, such as a cELISA kit described above.

A. Competitive Enzyme-Linked Immunosorbent Assay

Generally, the method includes (a) contacting the *B. mallei* LPS with a test sample in a test vessel, (b) contacting the B5 binding component, such as a B5 antibody, with the *B. mallei* LPS in the test vessel, (c) developing a signal, and (d) measuring the signal.

The method may also include contacting a control sample with an antibody-detection label conjugate with the *B. mallei* LPS in a first control vessel and/or contacting the B5 binding component, such as a B5 antibody, with the *B. mallei* LPS, and then contacting the bounded B5 binding component, such as the B5 antibody, with an antibody-detection label conjugate, in a second control vessel.

The control sample, when included in the method, is a sample having a known concentration of the antibodies raised by the subject against *B. mallei, B. pseudomallei*, or *B. thailandensis*. The control sample may be a negative control, which does not contain any antibody raised by the subject against *B. mallei, B. pseudomallei*, or *B. thailandensis*.

In some forms, the method includes contacting the B5 binding component, such as a B5 antibody, with the *B. mallei* LPS, and then contacting the bounded B5 binding component, such as the B5 antibody, with an antibody-detection label conjugate and optionally a substrate to develop and measure a control signal, in the second control vessel, prior to step (a), during step (a), subsequent to step (a) and prior to step (b), during step (b), or subsequent to step (b) and prior to step (c). The control signal developed and measured from the second control vessel can be used to analyze the percentage of inhibition of the B5 binding component, which is a result of binding between the *B. mallei* LPS and antibodies raised by the subject against *B. mallei, B. pseudomallei*, or *B. thailandensis* (described below).

1. Contacting Test Sample with *B. mallei* LPS

Bacterial LPS are important antigens that are often used in serological tests for the detection of specific antibodies. LPS is anchored to the outer membrane of the bacteria with its highly immunoreactive hydrophilic polysaccharide exposed which interacts with the immune system of the infected host to produce anti-LPS antibodies.

The method typically includes (a) contacting the *B. mallei* LPS with a test sample in a test vessel. In some forms, prior to step (a), the user dissolves the *B. mallei* LPS in the form of a solid, or dilutes the *B. mallei* LPS in the form of a liquid, with a first dilution buffer to form an antigen solution, optionally wherein the concentration of the *B. mallei* LPS in the antigen solution is in a range from 0.1 ng/µl to 10 ng/µl, and adds the antigen solution to each microtiter well such that the *B. mallei* LPS is immobilized on a surface of the plate inside each microtiter well to form a reaction region. The immobilized *B. mallei* LPS may be at an amount between about 0.1 ng and 10 ng per reaction region of a vessel. The first dilution buffer may be provided in the cELISA kit.

The method may include providing the *B. mallei* LPS is in the form of a solid, pre-immobilized on a surface of the plate inside each microtiter well to form a reaction region.

The method may further include adding a blocking buffer in each microtiter well to block unoccupied surface inside the microtiter well prior to or subsequent to (a), such as subsequent to (a). The blocking buffer may be provided in the cELISA kit.

Exemplary blocking agents include BSA, serum and biotin-free single purified glycoprotein, and non-protein blocking compound.

The method may further include diluting a biological sample with a sample dilution buffer at a ratio in a range from 1:5 to 1:500 (v/v, biological sample:sample dilution buffer) to form the test sample prior to (a), and optionally the sample dilution buffer is provided in the cELISA kit. The biological sample may be a bodily fluid or mucus, such as saliva, sputum, tear, sweat, urine, exudate, blood, serum, plasma, and vaginal discharge.

2. Contacting Antibody with *B. mallei* LPS

The method typically includes contacting the B5 binding component, such as B5 antibody or its binding fragments, with *B. mallei* LPS. This step may include dissolving the antibody in the form of a solid, or diluting the antibody in the form of a liquid, in a second dilution buffer to form an antibody solution prior to step (a) or subsequent to step (a) and prior to step (b), wherein the concentration of the antibody in the antibody solution is in a range from 1 ng/µL to 10 ng/µL. The second dilution buffer may be provided in the cELISA kit.

The method may further include washing the reaction region with a wash buffer for one or more times prior to (a), subsequent to step (b) and prior to step (c), or subsequent to (c) and prior to (d), or combinations thereof. The wash buffer may be provided in the cELISA kit.

3. Developing Signal

The step of developing signal typically includes providing a B5 antibody-specific detection label conjugate. The detection label conjugate may be any moiety specific to the binding fragment and/or the constant region of B5 antibody. Therefore, the method may be practiced with samples from various animals while the detection of the signal may utilize the same detection label conjugate for detecting the bound B5 antibody. This allows for diversifying the assay to screen diverse test samples leaving the rest of the components for the cELISA unchanged.

The detection label conjugate may be a conjugate of a secondary antibody raised against a mouse monoclonal IgG2 antibody (the subclass of the B5 anybody), or against the binding fragment of the B5 anybody, and conjugated to a detection label.

There are numerous detection labels in the art for use in immunoassays. These include enzymes, fluorescent tags, quantum dots, etc. The detection labels are well known in the art and widely used in immunoassays.

Exemplary detection labels include enzymes (e.g. horseradish peroxidase (HRP) and alkaline phosphatase (AP)) or fluorescent tags, such as Alexa Fluor® dyes 405, 488, 555, 568 594, 647, 680, 750, and 790.

The signal is developed by providing an enzyme-specific substrate solution to the detection label conjugates containing enzymes (e.g. HRP- or AP-labeled conjugates), or by excitation/emission readout from detection label conjugates containing fluorescent tags (e.g. Alexa Fluor® dye-labeled conjugates).

In the case of the detection label conjugate containing HRP, the substrates may be TMB (3,3',5,5'-tetramethylbenzidine), ABTS (2,2'-Azinobis [3-ethylbenzothiazoline-6-sulfonic acid]-diammonium salt), and OPD (o-phenylenediamine dihydrochloride), producing a colored product as a result of the enzymatic reaction that has an absorbance at about 450 nm wavelength. Typically, the obtained results are absorbance values at a given wavelength, presented as optical density (OD) at the measured wavelength. In the case of the detection label conjugates containing fluorescent tags, the obtained signal is in the form of fluorescence units.

4. Measuring Signal

The signal from the detection label conjugates may be measured using spectrophotometry and fluorimeter. Spectrophotometers and fluorimeters are well known and routinely used in the art.

5. Analysis of Signal

The signal is typically measured from at least the test vessel containing B5 antibody interaction with purified *B. mallei* LPS and the test sample interaction with purified *B. mallei* LPS. The signal may also be measured from the control vessel containing the B5 antibody interaction with purified *B. mallei* LPS. These signals may be developed by providing a B5 antibody-specific detection label conjugate and optionally a substrate to the test vessel and the control vessel.

The signal measured from the test vessel and the control vessel may be used to calculate the percentage inhibition (PI, %) of the signal by the test sample.

The PI is derived according to the following formula:

PI=100−[(signal of test vessel/signal of the control vessel)×100]

to detect the presence, absence, and/or the concentration of *B. mallei* antibody.

6. Cutoff Value

The method may be used with samples obtained from subjects with known *B. mallei* infection (known positive samples) as well as with samples from subjects known to be free of *B. mallei* infection (known negative samples). The PI values obtained from known negative samples may be used to establish a cutoff value for the cELISA assay for detecting the presence or absence of *B. mallei* antibodies in a test sample.

The PI values obtained from known positive samples may be used to establish the sensitivity and the specificity of the cELISA assay for detecting the presence or absence of *B. mallei* antibodies in a test sample.

For example, the cELISA may use between 0.1 ng and 10 ng *B. mallei* LPS, a sample serum dilution between about 1:5 and 1:50, and an antibody with the antibody binding fragment of the B5 antibody at a concentration between about 1 ng/µl and 10 ng/µl to obtain PI values for known negative samples. The PI value corresponding to 1.5 standard deviations (SD) above their mean PI, or 2 SD above their mean PI, may be used as a cutoff value to distinguish between the test samples with the presence or absence of the of *B. mallei* antibodies in a test sample.

In the examples below, an exemplary method shows the use of 2 ng *B. mallei* LPS, a sample serum dilution of 1:20, and the B5 antibody at 3.5 ng/µL to test known negative samples from 136 glanders-free seronegative horses. The calculated PI values ranged from −9.2 to 38.6% with a mean PI of 20.7%. At 2 SD above the mean PI, the calculated cutoff value was defined as 45.9%, meaning that sera with PI values above 45.9% was considered positive for anti-LPS antibody. However, all calculated PI values from the seronegative samples were in fact placed below 39.6% inhibition, which corresponds to 1.5 SD above their mean PI. This indicated that, using a representative number of negative controls, this lower PI value may also be considered a cutoff threshold of the cELISA.

Based on this observation, the cutoff value of the LPS-based cELISA was 39.6%, with calculated PI values between 39.6 to 45.9% defined as "weakly positive". Serum samples with a PI value of less than 39.6% were considered negative for the presence of anti-LPS antibodies.

For animals with serum samples that had calculated PI values within the "weakly positive" range, the collection and retesting of another serum sample may be needed to confirm the positive presence of anti-*B. mallei* LPS antibodies.

7. Selectivity and Sensitivity

The sensitivity can be expressed as a percentage, the proportion of actual positives which are correctly identified as such (e.g., the percentage of test subjects having *B. mallei, B. pseudomallei*, or *B. thailandensis* infection correctly identified by the test as having the infection). A test with high sensitivity has a low rate of false negatives, i.e., the cases of *B. mallei, B. pseudomallei*, or *B. thailandensis* infections not identified as such. Generally, the disclosed assays and methods have a sensitivity of at least 90%, at least 92%, at least 94%, at least 95%, at least 96%, at least 97%, at least 98%, at least 99%, or at least 100%.

The specificity can be expressed as a percentage, the proportion of actual negatives which are correctly identified as such (e.g., the percentage of test subjects not having *B. mallei, B. pseudomallei*, or *B. thailandensis* infection correctly identified by the test as not having the infection). A test with high specificity has a low rate of false positives, i.e., the cases of individuals not having *B. mallei, B. pseudomallei*, or *B. thailandensis* infection but suggested by the test as having the infection. Generally, the disclosed methods have a specificity of at least 90%, at least 92%, at least 94%, at least 95%, at least 96%, at least 97%, at least 98%, at least 99%, or at least 100%.

In some forms, the competitive ELISA method with the isolated B5 monoclonal antibody typically detects the presence of *B. mallei* antibody in the test sample with a sensitivity above 95%, such as between 95% and 100% sensitivity, and specificity above 95%, such as between 95% and 100% specificity, when the measured signal produces PI above about 39%, such as above 39.6%, or above 40%.

In some forms, the competitive ELISA method with the isolated B5 monoclonal antibody typically detects the absence of *B. mallei* antibody in the test sample with a sensitivity above 95%, such as between 95% and 100% sensitivity, and specificity above 95%, such as between 95% and 100% specificity, when the measured signal produces PI below about 40%, such as below 39.6%, or below 39%.

B. Use in Therapy

In some forms, the isolated monoclonal antibodies (i.e. B5 antibody), and the isolated binding fragments, isolated antibody fragments, isolated chimeric antibodies, and isolated humanized antibodies derived therefrom having a binding specificity to *B. mallei, B. pseudomallei*, or *B. thailandensis* (collectively referred to herein as "B5 binding component") may be used in treating subjects with a *B. mallei, B. pseudomallei*, or *B. thailandensis* infection.

The treatment may include antibody fragment therapy utilizing only the isolated antibody fragments, or antibody therapy utilizing the isolated monoclonal antibodies, isolated chimeric antibodies, and isolated humanized antibodies having a binding specificity to *B. mallei, B. pseudomallei*, or *B. thailandensis*. In these forms, the isolated binding fragments, isolated antibody fragments, isolated monoclonal antibodies, isolated chimeric antibodies, and isolated humanized antibodies, such as those having the binding specificity of the B5 monoclonal antibody produced from the B5 hybridoma cell line as deposited, may be administered to a subject in need thereof. The subject may be infected with *B. mallei, B. pseudomallei*, or *B. thailandensis* or may be susceptible to an infection by *B. mallei, B. pseudomallei*, or *B. thailandensis*. Typically, the subject is administered an effective amount of the isolated B5 antibody fragments, isolated B5 monoclonal antibodies, isolated B5 chimeric antibodies, and isolated B5 humanized antibodies, to treat one or more symptoms of a disease.

The effective amount of the isolated B5 antibody fragments, isolated B5 monoclonal antibodies, isolated B5 chimeric antibodies, and isolated B5 humanized antibodies may be between about 0.1 mg/kg and 100 mg/kg.

The disclosed antibodies, test kits, and methods of using can be further understood through the following enumerated paragraphs.

1. An antibody comprising a binding fragment, in an N- to C-direction, the following structural domains:

N-FR1-CDR1-FR2-CDR2-FR3-CDR3-FR4-C wherein
FR denotes a framework region and CDR denotes a complementary determining region, and
wherein the antibody binding fragment is produced from a B5 hybridoma cell line.

2. The antibody of paragraph 1, wherein the antibody is an isolated monoclonal antibodies, isolated chimeric antibodies, or isolated humanized antibodies.

3. The antibody of paragraph 1 or 2 having a binding specificity to bacterial extract from *Burkholderia mallei, Burkholderia pseudomallei*, or *Burkholderia thailandensis*.

4. The antibody of any one of paragraphs 1-3, wherein the binding fragment has a relative binding specificity to purified lipopolysaccharide (LPS) from *Burkholderia mallei, Burkholderia pseudomallei*, or *Burkholderia thailandensis* over bovine serum albumin (BSA) at a ratio between about 2:1 and 20:1.

5. The antibody of any one of paragraphs 1-4, wherein the binding fragment has a relative binding specificity to purified LPS from *Burkholderia mallei, Burkholderia pseudomallei*, or *Burkholderia thailandensis* over bovine serum albumin (BSA) at a ratio between about 5:1 and 20:1.

6. The antibody of any one of paragraphs 1-5, in a composition for detecting antibodies against *Burkholderia mallei, Burkholderia pseudomallei*, or *Burkholderia thailandensis*.

7. The antibody of any one of paragraphs 1-5, in a composition for treating a *Burkholderia mallei, Burkholderia pseudomallei*, or *Burkholderia thailandensis* infection.

8. A hybridoma cell line encoding the binding fragment of any one of paragraphs 1-5.

9. The hybridoma cell line of paragraph 8 in a medium for cultivation.

10. The hybridoma cell line of paragraph 8 or 9 in a medium for cultivation to isolate the antibody of any one of paragraphs 1-5.

11. A kit comprising the antibody of any one of paragraphs 2-5, and optionally, an antigen.

12. The kit of paragraph 11, wherein the antigen is a purified *B. mallei* lipopolysaccharide ("LPS").

13. A test kit for detecting the presence, absence, and/or the concentration of *Burkholderia mallei* ("*B. mallei*") antibodies in a test sample, the kit comprising
an antigen and the antibody of any one of paragraphs 2-5.

14. The test kit of paragraph 13, wherein each of the antigen and the antibody is in the form of a solid or a liquid.

15. The test kit of paragraph 13 or 14 further comprising a solid support, wherein the antigen is in the form of a solid immobilized on a surface of the solid support.

16. The test kit of paragraph 15, wherein the solid support is a plate comprising a plurality of microtiter wells, wherein and the antigen is immobilized on a bottom surface of at least a portion of the wells.

17. The test kit of paragraph 15 or paragraph 16, wherein the solid support further comprises an inlet and a first channel or a first set of channels,
wherein the first channel or first set of channels is configured to allow a solution to flow from the inlet to the reaction region.
18. The test kit of paragraph 17, wherein the solid support further comprises a second channel or a second set of channels and an outlet,
wherein the second channel or second set of channels is configured to allow the solution to flow from the reaction region to the outlet.
19. The test kit of any one of paragraphs 13-18 further comprising one or more reagents selected from the group consisting of a second antibody-detection label conjugate, an enzyme substrate, and a stop solution, and combinations thereof.
20. The test kit of any one of paragraphs 13-19 further comprising one or more buffer solutions selected from the group consisting of a blocking buffer, a sample dilution buffer, an enzyme dilution buffer, a wash buffer, and combinations thereof.
21. The test kit of paragraph 19 or paragraph 20, wherein each reagent, each buffer, or each of the reagent and buffer is provided in a form of a solid or a liquid.
22. The test kit of any one of paragraphs 13-21 further comprising a control sample.
23. The test kit of any one of paragraphs 13-22 further comprising an instruction for use.
24. The test kit of any one of paragraphs 13-23, wherein the antigen is purified *B. mallei* LPS, and optionally, wherein the *B. mallei* LPS is purified from *B. mallei* strain MB1731.
25. The test kit of any one of paragraphs 19-24, wherein the second antibody-detection label conjugate is a conjugate of a horse radish peroxidase (HRP) enzyme and the enzyme substrate is tetramethylbenzidine ("TMB").
26. A competitive enzyme-linked immunosorbent assay ("cELISA") kit for detecting the presence, absence, and/or the concentration of *B. mallei* antibodies in a biological sample comprising
a plate comprising a plurality of microtiter wells;
a purified *B. mallei* LPS; and
the antibody of any one of paragraphs 2-5,
wherein each of the purified *B. mallei* LPS and antibody is in the form of a solid or a liquid.
27. The cELISA kit of paragraph 26 further comprising one or more reagents selected from the group consisting of a second antibody-detection label conjugate, an enzyme substrate, a stop solution, and combinations thereof.
28. The cELISA kit of paragraph 26 or paragraph 27 further comprising one or more buffer solutions selected from the group consisting of blocking buffer, dilution buffers, a sample dilution buffer, an enzyme dilution buffer, a wash buffer, and combinations thereof.
29. The cELISA kit of paragraph 27 or paragraph 28, wherein each reagent, each buffer, or each of the reagent and buffer is provided as a solid or a liquid.
30. The cELISA kit of any one of paragraphs 26-29 further comprising a control sample, optionally wherein the control sample is provided as a solid or a liquid.
31. The cELISA kit of any one of paragraphs 26-30 further comprising an instruction for use.
32. The cELISA kit of any one of paragraphs 26-31, wherein the purified *B. mallei* LPS is purified from *B. mallei* strain MB1731.
33. The cELISA kit of any one of paragraphs 27-32, wherein the second antibody-detection label conjugate is a conjugate of a horse radish peroxidase (HRP) enzyme and the enzyme substrate is TMB.
34. The cELISA kit of any one of paragraphs 26-33, wherein the purified *B. mallei* LPS is in the form of a solid immobilized on a bottom surface of at least a portion of the microtiter wells, and the antibody is in the form of a solid or liquid.
35. A method of detecting the presence, absence, and/or the concentration of *B. mallei* antibody in a test sample comprising
(a) contacting a *B. mallei* antigen with a test sample in a test vessel,
(b) contacting the *B. mallei* antigen with the antibody of any one of paragraphs 2-5 in the test vessel subsequent to step (a),
(c) developing a test signal in the test vessel, and
(d) measuring the test signal from the test vessel.
36. The method of paragraph 35 further comprising contacting the *B. mallei* antigen with the antibody in a control vessel prior to step (a), during step (a), subsequent to step (a) and prior to step (b), during step (b), or subsequent to step (b) and prior to step (c).
37. The method of paragraph 36 comprising developing a control signal in the control vessel and measuring the control signal from the control vessel.
38. The method of any one of paragraphs 35-37, wherein the *B. mallei* antigen is a purified *B. mallei* LPS at a concentration between about 0.1 ng and about 10 ng.
39. The method of any one of paragraphs 35-38, wherein the antibody is at concentration between about 1 ng/µl and 10 ng/µl.
40. The method of any one of paragraphs 35-39, wherein the test sample is a diluted sample obtained from a subject, wherein the subject is a human, a non human primate, domestic animal, farm animal, or a laboratory animal.
41. The method of any one of paragraphs 35-40, wherein the test sample is a diluted sample of a bodily fluid or mucus selected from the group consisting of saliva, sputum, tear, sweat, urine, exudate, blood, serum, plasma, or a vaginal discharge.
42. The method of any one of paragraphs 35-41, wherein the test sample is a diluted sample diluted at a ratio between about 1:5 and 1:500 (v/v) of the sample to a sample dilution buffer.
43. The method of any one of paragraphs 36-42, wherein developing a signal comprises adding an antibody-detection label conjugate and a label substrate to the test vessel and the control vessel.
44. The method of paragraph 43, wherein the antibody-detection label conjugate is a conjugate of an antibody and a horse radish peroxidase (HRP) enzyme, the antibody having a binding specificity to the isolated monoclonal antibody.
45. The method of any one of paragraphs 37-44 further comprising
converting the test signal from the test vessel and the control signal from the control vessel to a Percentage Inhibition ("PI") value according to the formula: PI=100−[(test signal of test vessel/control signal of the control vessel)×100] to detect the presence, absence, and/or the concentration of *B. mallei* antibody.
46. The method of paragraph 45, wherein the method detects the presence of *B. mallei* antibody in the test sample at a sensitivity above 95% and specificity above 95% when the PI is above about 39%.

47. The method of paragraph 45 or 46, wherein the method detects the absence of *B. mallei* antibody in the test sample at a sensitivity above 95% and specificity above 95% when the PI is below about 39%.

48. The method of any one of paragraphs 35-47, wherein measuring the signal comprises measuring an optical density (OD) of the signal developed in (c).

49. The method of paragraph 48, wherein percentage inhibition is measured according to the formula: PI=100−[(OD of test vessel/OD of the control vessel)×100].

EXAMPLES

Example 1. Monoclonal Anti-LPS Antibody B5 ("mAb B5") is Specific to Lipopolysaccharide ("LPS")

Materials and Methods

Purification of LPS

All experiments involving live *B. mallei* followed the approved standard operating procedures of the HKU Biosafety Level-3 facility. LPS was extracted and purified from *B. mallei* strain MB1731 using the LPS Extraction Kit (iNtRON Biotechnology, Korea) as per the manufacturer's instructions with minor modifications. Briefly, bacterial cells from culture on horse blood agar grown for 3 days at 37° C. were harvested and lysed in 20 mL lysis buffer. Cell clumps were dissolved by vigorous vortexing and 4 mL chloroform was added. The sample was then vortexed briefly, incubated at room temperature for 5 mM and centrifuged at 11,000× g for 10 mM at 4° C. The top aqueous layer was transferred to a clean tube and two volumes of purification buffer were added. The sample was incubated for 10 mM at −20° C. and centrifuged at 11,000× g for 15 mM at 4° C. The LPS pellet was then washed with 70% EtOH and dissolved in 10 mM Tris-HCl buffer (pH 8.0) by vortexing and boiling for 2 min. The extracted LPS was further treated with 2.5 μg proteinase K per 1 μg LPS for 30 mM at 50° C. to remove contaminating proteins.

Immunization of MICE for Production of mAbs

The use of mice in this study for monoclonal antibody production was approved by the Committee on the Use of Live Animals in Teaching and Research (CULATR), The University of Hong Kong (approval number 4124-16). All the experimental procedures were performed in accordance with the International Guiding Principles for Biomedical Research Involving Animals regarding the care and use of animals.

BALB/c mice were immunized five times at two-week intervals with 50 μg of purified LPS via intraperitoneal injections without adjuvant. Antibody titer to LPS was assessed using ELISA at weeks 4 and 6 post-immunization. A final boost of 50 μg LPS was injected intravenously 3 days prior to the harvesting of spleen cells. Hybridoma cell lines were then produced as previously described (Yokoyama, *Curr. Protoc. Mol. Biol.*, 11:11.10 (2008)) and assessed for anti-LPS mAbs using an indirect ELISA coated with purified LPS.

Production and Purification of mAbs by Ascites Induction

Hybridoma line (B5) positive for anti-LPS mAbs were propagated and 5×10$^6$ cells were administered into BALB/c mice via intraperitoneal infection following priming with Freund's incomplete adjuvant (Sigma) as previously described (Yokoyama, *Curr. Protoc. Mol. Biol.*, 11:11.10 (2008)). Ascitic fluid was collected and stored at −80° C. with 0.02% sodium azide. The mAb was then purified using Protein G-Agarose (Roche) as per the manufacturer's instructions. The subclass and light chains of the purified antibody was then determined using the Pierce Rapid Detection Kit (ThermoFisher) as per the manufacturer's instructions.

Western Blot Analysis

Purified LPS (5 ng) was mixed with SDS-PAGE sample buffer and boiled for 10 min. The samples were then run by electrophoresis on a 15% SDS gel followed by semi-dry transfer onto PVDF membrane. The membranes were blocked with 5% skim milk in tris-buffered saline/Tween (TBST; 50 mM Tris, 150 mM NaCl, 0.1% Tween 20; pH 7.6) for 3 h and incubated with 1 μg/mL of B5 mAb at 4° C. overnight. Goat anti-mouse IgG (H+L) cross-absorbed secondary antibody, DyLight 680 (Invitrogen) was used at 1:5,000 dilution to facilitate detection via fluorescent signal. The final development of the signal was detected using the Odyssey CLx Near-Infrared Fluorescence Imaging System (LICOR) and analyzed using the Image Studio software (LICOR).

Specificity Test of mAb B5 and Optimization Using Indirect ELISA

The specificity of mAb B5 to LPS and the concentration to use for the assay was assessed using indirect ELISA. Microtiter plates (Thermo Scientific) were coated with 0 to 4 ng of purified LPS or bovine serum albumin (BSA) in 0.05 M carbonate buffer (15 mM $Na_2CO_3$, 3.5 mM $NaHCO_3$) and dried at 42° C. for 3 h. Wells were then blocked with blocking buffer (0.121% Tris-base, 0.2% gelatin, 2% sucrose, 0.02% thimerosal, 0.25% casein, 0.5% Tween 20) at 4° C. overnight. After blocking, the plates were used immediately or completely dried and stored at 4° C. for up to 3 months.

To assess the concentration of mAb B5 to use, plates were incubated with 1.75, 3.5, and 7 ng/μL mAb B5 diluted in sample dilution buffer (1× PBS, 1% BSA, 0.1% Tween 20) at 37° C. for 1 h. After incubation, the plates were washed with phosphate-buffered saline/Tween (PBST; 1× PBS, 0.5% Tween 20) and incubated with 1:1,000 anti-mouse IgG horseradish peroxidase (HRP) conjugate (ThermoFisher Scientific) diluted in enzyme dilution buffer (1× PBS, 20% fetal bovine serum, 0.5% Tween 20) at 37° C. for 1 h. The plates were washed again with PBST and developed by adding 100 μL of tetramethylbenzidine (TMB) substrate (ThermoFisher Scientific) into each well. After 10 min, 0.3 M $H_2SO_4$ was used to stop the reaction and the optical density at 450 nm ($OD_{450}$) was read using a PerkinElmer VICTOR X3 multilabel reader.

Results

Bacterial LPS are important antigens that are used in serological tests for the detection of specific antibodies. LPS is anchored to the outer membrane of the bacteria with its highly immunoreactive hydrophilic polysaccharide exposed, which interacts with the immune system of the infected host to produce anti-LPS antibodies. LPS from a clinical strain of *B. mallei* of an infected horse and used it to immunize mice for the generation of mAb B5 against the LPS.

Figure 1B:
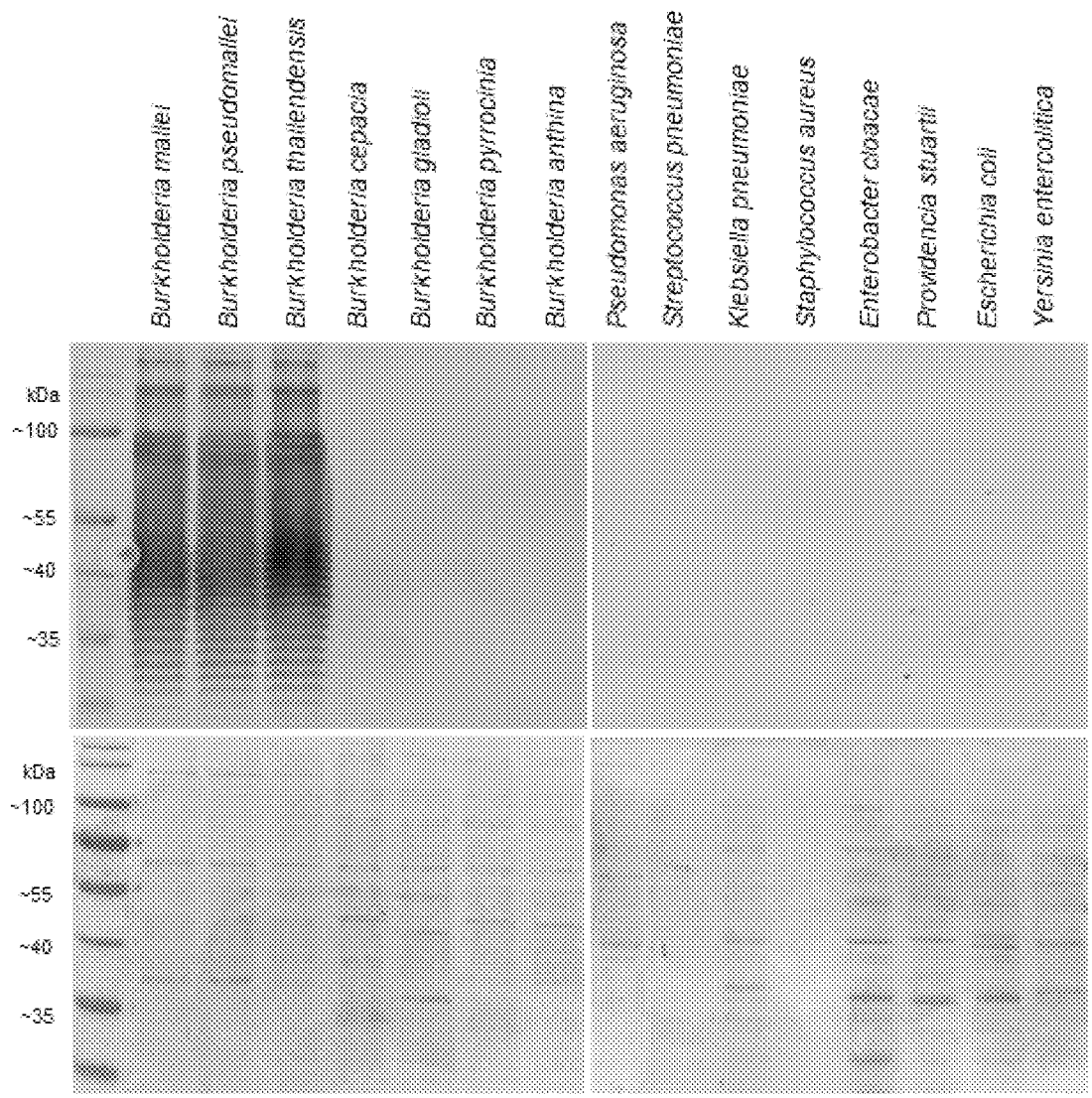
FIG. 1B is a set of images showing Western blot (top panel) of the mouse monoclonal anti-LPS antibody B5 against bacterial extracts from seven *Burkholderia* species and eight common Gram-negative pathogens. The bottom panel shows the protein present in each lane as stained by Coomassie blue.

The mouse mAb B5 against *B. mallei* LPS was generated in this study using hybridoma technology (FIGS. 1A and 1B). The isotype of B5 was determined to be of the subclass IgG2b with λ light chains. Western blotting shows high specificity of mAb B5 for *B. mallei* LPS, displaying the characteristic ladder pattern of LPS (FIG. 1A). In contrast, no immunoreaction was detected between mAb B5 and BSA.

The specificity of mAb B5 in the detection of LPS was further demonstrated using indirect ELISA. Microtiter plates were coated with a series of two-fold dilutions of *B. mallei* LPS or BSA (0 to 4 ng) and was incubated with mAb B5 at a concentration of 1.75, 3.5 or 7 ng/µL. As shown in FIG. 2, absorbance at 450 nm increases with increasing LPS concentration, while no significant change is shown with increasing BSA protein. These results show high specificity of mAb B5 for *B. mallei* LPS. The data for producing the curves in FIG. 2 is presented in Table 1 below.

TABLE 1

Absorbance at 450 nm of *B. mallei* LPS or BSA incubated with mAb B5.

| Protein (ng) | LPS + mAb (ng/ul) | | | BSA + mAb (ng/ul) | | |
|---|---|---|---|---|---|---|
| | 1.75 | 3.5 | 7 | 1.75 | 3.5 | 7 |
| 4 | 1.9745 | 2.1155 | 2.284 | 0.055 | 0.064 | 0.0595 |
| 2 | 1.803 | 1.9985 | 2.2825 | 0.087 | 0.1 | 0.064 |
| 1 | 1.724 | 1.9505 | 2.0935 | 0.089 | 0.0885 | 0.089 |
| 0.5 | 1.6485 | 1.997 | 2.083 | 0.133 | 0.1255 | 0.1075 |
| 0.25 | 1.643 | 1.919 | 2.0675 | 0.12 | 0.1685 | 0.152 |
| 0.125 | 1.497 | 1.771 | 1.935 | 0.125 | 0.154 | 0.0955 |
| 0 | 0.056 | 0.063 | 0.067 | 0.061 | 0.0665 | 0.0645 |

Based on these indirect ELISA results, the amount of LPS (2 ng per well) and concentration of mAb B5 (3.5 ng/µL) to use in the cELISA assay is determined. Interactions between LPS and mAb B5 are stable under these conditions.

Example 2. LPS-Based Competitive ELISA ("cELISA") is Sensitive and Specific for Detecting Anti-LPS Antibodies in Sera of Different Animals Materials and Methods Serum Samples A hundred and seventy-seven seronegative sera were obtained to develop and evaluate the cELISA test. These included 136 sera from glanders-free horses obtained from the Agricultural, Fisheries and Conservation Department (AFCD), Hong Kong and 21 horse sera and 20 donkey sera obtained from the Central Veterinary Research Laboratory (CVRL), Dubai, The United Arab Emirates. In addition, five sera obtained from donkeys artificially infected with *B. mallei* and 25 and 6 sera from horses in glanders outbreaks of Bahrain in year 2010-2011 (Scholz, et al., *PLoS Negl. Trop. Dis.*, 8(9):e3195 (2014)) and Kuwait in year 2019, respectively.

For the five donkeys, they were infected with *B. mallei* strain MB1731 isolated from a glanderous horse from Syria at an inoculum concentration of $1.0 \times 10^9$ CFU/mL and $1.0 \times 10^8$ CFU/mL for two oral routes of infection; $4.0 \times 10^8$ CFU/mL for direct feeding through feed; and $1.0 \times 10^8$ CFU/mL for intranasal and $2.0 \times 10^2$ CFU/mL for subcutaneous routes of infection. Two donkeys were orally infected by direct injection of inoculum to oropharynx with 1 mL of inoculum, one by direct feeding of 1 mL of inoculum, one by nasal spray of 1 mL of inoculum, and one injected with 1 mL of inoculum subcutaneously on the left side of the neck.

The identity of *B. mallei* strain MB1731 was confirmed using groEL gene sequencing. Blood was taken from the donkeys from day 7 post infection until euthanized (after 80 days). All serum samples were tested using the complement fixation test (CFT), which served as the gold standard in this study (Sprague, et al., *BMC Vet. Res.*, 5:32 (2009)).

Competitive ELISA cELISA was performed to detect the presence of anti-LPS antibodies in serum samples. Plates were coated with 2 ng of purified LPS and blocked as per the indirect ELISA. The plates were first incubated with 50 µL of 1:20 serum sample (or unless otherwise specified) diluted in sample dilution buffer. Fifty microliters of 3.5 ng/µL mAb B5 diluted in sample dilution buffer was then added and the plates were incubated at 37° C. for 1 h. After incubation, the plates were washed with PBST and incubated with 1:1,000 anti-mouse IgG HRP conjugate diluted in enzyme dilution buffer at 37° C. for 1 h. The plates were washed again with PBST and developed by adding 100 µL of TMB substrate into each well. After 10 min, 0.3 M $H_2SO_4$ was used to stop the reaction and the optical density at 450 nm ($OD_{450}$) was read using a PerkinElmer VICTOR X3 multilabel reader.

If the test serum does not contain anti-LPS antibodies, mAb B5 would bind to LPS, resulting in color development. However, if there is anti-LPS antibodies in the test serum due to *B. mallei* infection, the anti-LPS antibodies will compete with mAb B5 for the epitope site and inhibit the binding of mAb B5 to LPS, resulting in an inverse proportional development of color. A conjugate control was included for the interpretation of the cELISA results. Results of cELISA were interpreted by percentage inhibition (PI) using the following formula:

$$PI = 100 - [(OD_{450} \text{ of serum sample}/OD_{450} \text{ of conjugate control}) \times 100].$$

Results

The cELISA developed here allows the detection of these anti-LPS antibodies in animal sera through competition with LPS-mAb B5 interactions, which in turn provides serodiagnosis of *B. mallei* infection.

Figure 3:
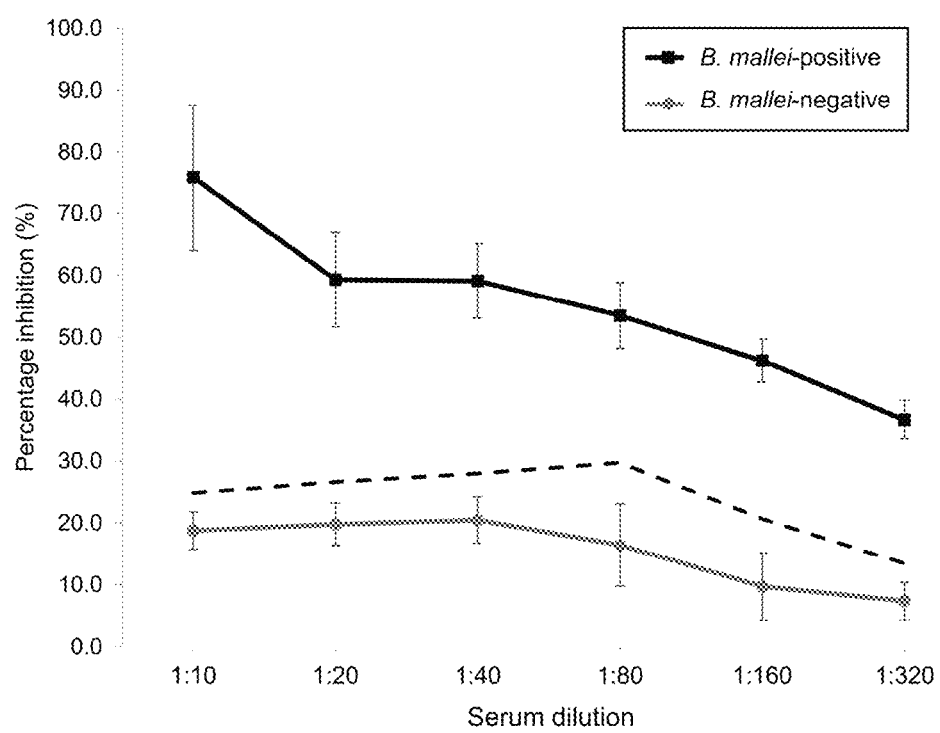
FIG. 3 is a graph showing LPS-based competitive ELISA (cELISA) in the presence of 2 ng of *B. mallei* LPS and 3.5 ng/μL mAb B5 with varying dilutions of *B. mallei*-positive and negative sera. cELISA values were calculated as percentage inhibition (PI) of mAb B5 binding. Serum from a glanders-seropositive horse (SE1719.4/19) in a glanders outbreak in Kuwait was used as the *B. mallei*-positive sample. Serum from a glanders-seronegative horse (ED18-0081-0001) from AFCD in Hong Kong was used as the *B. mallei*-negative sample. The dashed line indicates 2 standard deviations above the mean PI of the *B. mallei*-negative serum at each serum dilution.

The dilution of serum samples for the detection of anti-LPS antibody in sera (for use in cELISA) was determined. The serum sample SE1719.4/19 from a glanders-seropositive horse in Kuwait was used as the *B. mallei*-positive sample; a glanders-free seronegative horse sample ED18-0081-0001 obtained from AFCD, Hong Kong, was used as a *B. mallei*-negative sample. Microtiter plates coated with 2 ng *B. mallei* LPS was first mixed with various dilutions of the *B. mallei*-positive and -negative sera from 1:10 to 1:320 (diluted using a dilution buffer), followed by the addition of 3.5 ng/µL mAb B5. As shown in FIG. 3, the binding of mAb B5 to LPS is competitively inhibited by the presence of anti-LPS antibodies in the *B. mallei*-positive sample. As the test serum become more diluted, the calculated PI also decreases, demonstrating a lower concentration of anti-LPS antibody in the sample, resulting in a decrease in competition with mAb B5 for the LPS epitope. The data for producing the curves in FIG. 3 is presented in Table 2 below. There is no significant decrease in the calculated PI for BSA-coated wells in the presence of more diluted serum samples. The PI values of the *B. mallei*-positive serum samples at each dilution remain more than 2 SDs above the mean of the *B. mallei*-negative serum samples (presented as a dashed line in FIG. 3), demonstrating the ability of the cELISA to distinctly separate and determine a sample as *B. mallei*-positive or negative. The largest difference between the PI values of the *B. mallei*-positive and -negative samples is shown at the serum dilution of 1:10. However, taking into account that in actual situations, the volume of test serum available may be limited, the next best serum dilution of 1:20 is selected for use in the subsequent development and evaluation of the cELISA.

TABLE 2

Average percentage inhibition (%) of *B. mallei*-positive and *B. mallei*-negative samples tested using the developed cELISA.

| | B. mallei-positive | | B. mallei-negative | |
| --- | --- | --- | --- | --- |
| Serum dilution | Average percentage inhibition (%) | Standard deviation | Average percentage inhibition (%) | Standard deviation |
| 1:10 | 75.812 | 11.79259 | 18.771 | 3.026095 |
| 1:20 | 59.337 | 7.67504 | 19.777 | 3.417616 |
| 1:40 | 59.149 | 6.008841 | 20.461 | 3.762998 |
| 1:80 | 53.525 | 5.325654 | 16.436 | 6.648783 |
| 1:160 | 46.202 | 3.493403 | 9.723 | 5.479237 |
| 1:320 | 36.682 | 3.137263 | 7.362 | 3.025128 |

The conditions for the LPS-based cELISA are determined to be coating of microtiter plates with 2 ng *B. mallei*-LPS, using sample serum at 1:20 dilution, and incubating with 3.5 ng/µL mAb B5. These conditions were subsequently used for the cELISA.

Figure 4:
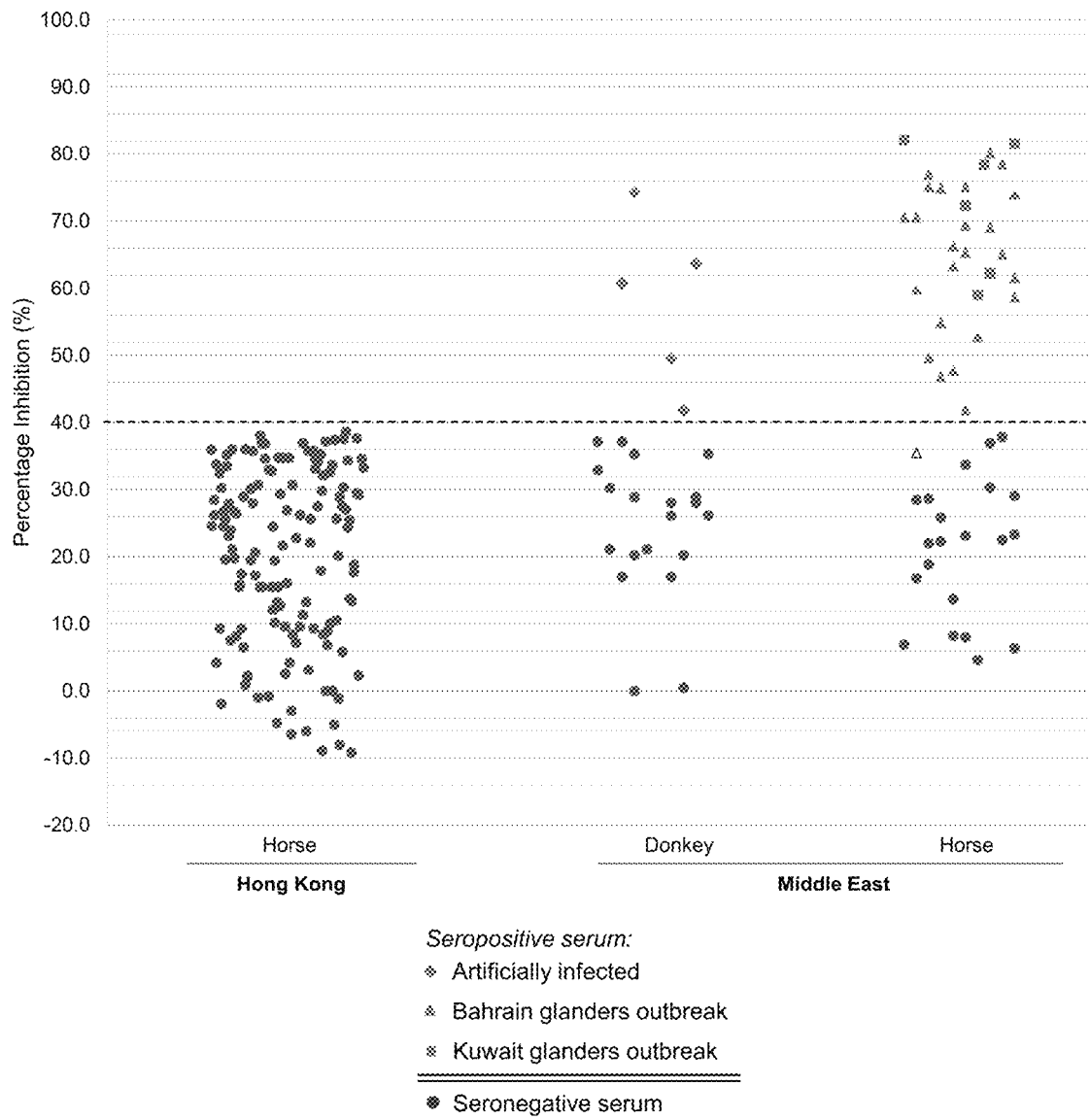
FIG. 4 is a graph showing the distribution of PI values of horse and donkey sera obtained from Hong Kong and the Middle East (Dubai, Bahrain and Kuwait), evaluated using the LPS-based cELISA. The cELISA cutoff value (PI of 39.6%) is indicated by the dashed line. Empty triangle represents the one glanders-positive serum that was tested as negative by the LPS-based cELISA.

The cutoff value of the cELISA was determined using serum samples from 136 glanders-free seronegative horses in Hong Kong. By protocol, these animals undergo strict quarantining at special stabling facilities after arrival and are required to be tested by local government authority to ensure that they are free of equine diseases, thus are useful glanders-free serum samples for determining the cutoff value of the cELISA. As shown in FIG. 4, the calculated PI values are in a range from −9.2 to 38.6% with a mean PI of 20.7%. At 2 SD above the mean PI. The calculated cutoff value is defined as 45.9%, meaning that sera with PI values above 45.9% are considered positive for anti-LPS antibody. However, results show that all calculated PI values from the seronegative samples are placed below 39.6% inhibition, which correspond to 1.5 SD above their mean PI. This shows that, using a representative number of negative controls, this lower inhibition value could also be considered a threshold for the cELISA. The cutoff value of the LPS-based cELISA is thus determined as 39.6%, with calculated PI values between 39.6 to 45.9% defined as "weakly positive". Serum samples with a PI value of less than 39.6% are considered negative for the presence of anti-LPS antibodies. For an animal with serum samples that show calculated PI values within the "weakly positive" range, the collection and retesting of an additional serum sample from the same animal is recommended to confirm the presence of anti-LPS antibodies.

The diagnostic sensitivity and specificity of the LPS-based cELISA was first evaluated using five seropositive sera from donkeys artificially infected with *B. mallei* and 20 seronegative donkey sera from Dubai. As shown in FIG. 4, the PI values of the positive sera range from 41.8 to 74.2% inhibition. The test serum of the donkey infected via the nasal route having the highest PI. This agrees with the natural transmission route of *B. mallei* between animals, which is facilitated by close contact, inhalation and ingestion of contaminated materials (Khan, et al., *Transbound Emerg. Dis.*, 60(3):204-221 (2013); World Organization for Animal Health (OIE), *Manual of diagnostic tests and vaccines for terrestrial animals,* 8th Ed. OIE, Paris, France pp. 1350-1362 (2019)). The test serum from the subcutaneously infected donkey shows the lowest PI, which falls within the range of "weakly positives", demonstrating the detection of only a low titer of anti-LPS antibody in this serum sample. This agrees with the expectation that when the calculated PI is within the range of 39.6 to 45.9%, the animal is likely to be positive for *B. mallei* infection, though the immune response of the animal to the bacteria may have been low or the animal may have only been recently exposed to the bacteria, resulting in low antibody levels.

The PI values of the negative donkey sera range from 0 to 37.3% inhibition. These calculated PI values agree with the defined PI cutoff value of 39.6% inhibition for the detection of anti-LPS antibody in sera samples.

The LPS-based cELISA was further evaluated using 31 serologically positive horse sera from glanders outbreaks in Bahrain and Kuwait as well as 21 seronegative horse sera from Dubai. The outbreak in Bahrain was a result from horses imported from Syria via Kuwait. Clonality of the outbreak was confirmed by high-resolution genotyping and comparative whole genome analysis and all the positive sera were confirmed by CFT. As shown in FIG. 4, the PI values of the seropositive sera from Bahrain range from 35.4 to 80.1% inhibition, while the PI values of the positive sera from Kuwait range from 59.0 to 82.1%. The PI values of the negative horse sera ranged from 4.6% to 37.8%. One positive serum from Bahrain (PI=35.4%) was tested as a false-negative by the assay.

Overall, based on the defined cELISA cutoff value of 39.6% inhibition, 97.2% (35/36) of the positive sera has been tested as positive, with 2/36 having a PI value within the "weakly positive" range, and 100% (41/41) of the negative sera has been tested as negative. These results agree with the expectation that samples with calculated PI values above 39.6% are positive, i.e. indicating the presence of anti-LPS antibodies. The results demonstrate that the LPS-based cELISA is highly sensitive (97.2%) and specific (100%) for the detection of anti-LPS antibodies in sera of different animals. Such high sensitivity and specificity makes the cELISA a user-friendly and inexpensive assay for laboratory diagnosis of glanders in veterinary laboratories. This also allows for a one-kit-for-multiple-animal serological test, which can serve to detect *B. mallei* antibodies in a variety of animals.

We claim:

1. An isolated antibody or antigen binding fragment thereof that binds to lipopolysaccharide (LPS) from *Burkholderia mallei, Burkholderia pseudomallei,* or *Burkholderia thailandensis*, the isolated antibody comprising:
    a heavy chain variable domain (VH) comprising three heavy chain complementarity regions (CDRs), VHCDR1, VHCDR2, and VHCDR3, and
    a light chain variable domain (VL) comprising three light chain CDRs, VLCDR1, VLCDR2, and VLCDR3;
    wherein the VHCDR1, VHCDR2, and VHCDR3 are VHCDR1, VHCDR2, and VHCDR3, respectively, of monoclonal antibody B5 produced from a hybridoma deposited under ATCC Accession Deposit Number PTA-127021, and
    wherein the VLCDR1, VLCDR2, and VLCDR3 are VLCDR1, VLCDR2, and VLCDR3, respectively, of monoclonal antibody B5 produced from the hybridoma deposited under ATCC Accession Deposit Number PTA-127021.

2. The isolated antibody of claim 1, wherein the isolated antibody is an isolated monoclonal antibody.

3. A chimeric antibody derived from the monoclonal antibody of claim 2.

4. A humanized antibody derived from the monoclonal antibody of claim 2.

5. The isolated antibody of claim 1 having a binding specificity to bacterial extract from *Burkholderia mallei, Burkholderia pseudomallei*, or *Burkholderia thailandensis*.

6. The isolated antibody of claim 1, having a relative binding specificity to purified lipopolysaccharide (LPS) from *Burkholderia mallei, Burkholderia pseudomallei*, or *Burkholderia thailandensis* over bovine serum albumin (BSA) at a ratio of a detection signal from binding to the *Burkholderia mallei* LPS, *Burkholderia pseudomallei* LPS, or *Burkholderia thailandensis* LPS to a detection signal from binding to BSA is between 2:1 and 20:1, when the concentration of purified lipopolysaccharide (LPS) from *Burkholderia mallei, Burkholderia pseudomallei*, or *Burkholderia thailandensis* is between 0.1 ng/µL and 10 ng/µL.

7. The isolated antibody of claim 1, having a relative binding specificity to purified LPS from *Burkholderia mallei, Burkholderia pseudomallei*, or *Burkholderia thailandensis* over bovine serum albumin (BSA) at a ratio between 5:1 and 20:1 of (i) a detection signal from binding of the binding fragment to the *Burkholderia mallei* LPS, *Burkholderia pseudomallei* LPS, or *Burkholderia thailandensis* LPS to (ii) a detection signal from binding of the binding fragment to BSA, when the concentration of purified lipopolysaccharide (LPS) from *Burkholderia mallei, Burkholderia pseudomallei*, or *Burkholderia thailandensis* is between 0.1 ng/µL and 10 ng/µL.

8. The isolated antibody of claim 1, in a composition for detecting antibodies against *Burkholderia mallei, Burkholderia pseudomallei*, or *Burkholderia thailandensis*.

9. The isolated antibody of claim 1, in a composition for treating a *Burkholderia mallei, Burkholderia pseudomallei*, or *Burkholderia thailandensis* infection.

10. The isolated antibody of claim 1, wherein the VH further comprises four framework regions VHFR1, VHFR2, VHFR3, and VHFR4, and the VL further comprises four framework regions VLFR1, VLFR2, VLFR3, and VLFR4.

11. The isolated antibody of claim 10, wherein the VHFR1, VHFR2, VHFR3, and VHFR4 of the isolated antibody are the same as or different from VHFR1, VHFR2, VHFR3, and VHFR4 of the monoclonal antibody B5 produced from the hybridoma deposited under ATCC Accession Deposit Number PTA-127021; and
wherein VLFR1, VLFR2, VLFR3, and VLFR4 of the isolated antibody are the same as or different from VHFR1, VHFR2, VHFR3, and VHFR4 of the monoclonal antibody B5 produced from the hybridoma deposited under ATCC Accession Deposit Number PTA-127021.

12. A kit comprising the antibody of claim 1, and optionally, an antigen.

13. The kit of claim 12, wherein the antigen is a purified *B. mallei* lipopolysaccharide ("LPS").

14. A test kit for detecting the presence, absence, and/or the concentration of *Burkholderia mallei* ("*B. mallei*") antibodies in a test sample, the kit comprising an antigen and the isolated antibody or antigen binding fragment of claim 1.

15. The test kit of claim 14, wherein each of the antigen and the isolated antibody or antigen binding fragment is in the form of a solid or a liquid.

16. The test kit of claim 14 further comprising a solid support, wherein the antigen is in the form of a solid immobilized on a surface of the solid support.

17. The test kit of claim 16, wherein the solid support is a plate comprising a plurality of microtiter wells, wherein the antigen is immobilized on a bottom surface of at least a portion of the wells.

18. The test kit of claim 16, wherein the solid support further comprises an inlet and a first channel or a first set of channels,
wherein the first channel or first set of channels is configured to allow a solution to flow from the inlet to the reaction region.

19. The test kit of claim 18, wherein the solid support further comprises a second channel or a second set of channels and an outlet,
wherein the second channel or second set of channels is configured to allow the solution to flow from the reaction region to the outlet.

20. The test kit of claim 14 further comprising one or more reagents selected from the group consisting of a second antibody-detection label conjugate, an enzyme substrate, and a stop solution, and combinations thereof.

21. The test kit of claim 20, wherein each reagent, each buffer, or each of the reagent and buffer is provided in the form of a solid or a liquid.

22. The test kit of claim 20, wherein the second antibody-detection label conjugate is a conjugate of a horse radish peroxidase (HRP) enzyme and the enzyme substrate is tetramethylbenzidine ("TMB").

23. The test kit of claim 14 further comprising one or more buffer solutions selected from the group consisting of a blocking buffer, a sample dilution buffer, an enzyme dilution buffer, a wash buffer, and combinations thereof.

24. The test kit of claim 14 further comprising a control sample.

25. The test kit of claim 14 further comprising an instruction for use.

26. The test kit of claim 14, wherein the antigen is purified *B. mallei* LPS, and optionally, wherein the *B. mallei* LPS is purified from *B. mallei* strain MB1731.

27. A competitive enzyme-linked immunosorbent assay ("cELISA") kit for detecting the presence, absence, and/or the concentration of *B. mallei* antibodies in a biological sample comprising
a plate comprising a plurality of microtiter wells;
a purified *B. mallei* LPS; and
the isolated antibody or antigen binding fragment of claim 1,
wherein each of the purified *B. mallei* LPS and the isolated antibody or antigen binding fragment is in the form of a solid or a liquid.

28. The cELISA kit of claim 27 further comprising one or more reagents selected from the group consisting of a second antibody-detection label conjugate, an enzyme substrate, a stop solution, and combinations thereof.

29. The cELISA kit of claim 28, wherein each reagent, each buffer, or each of the reagent and buffer is provided as a solid or a liquid.

30. The cELISA kit of claim 28, wherein the second antibody-detection label conjugate is a conjugate of a horse radish peroxidase (HRP) enzyme and the enzyme substrate is TMB.

31. The cELISA kit of claim 27 further comprising one or more buffer solutions selected from the group consisting of blocking buffer, dilution buffers, a sample dilution buffer, an enzyme dilution buffer, a wash buffer, and combinations thereof.

32. The cELISA kit of claim 27 further comprising a control sample, optionally wherein the control sample is provided as a solid or a liquid.

33. The cELISA kit of claim 27 further comprising an instruction for use.

34. The cELISA kit of claim 27, wherein the purified *B. mallei* LPS is purified from *B. mallei* strain MB1731.

35. The cELISA kit of claim 27, wherein the purified *B. mallei* LPS is in the form of a solid immobilized on a bottom surface of at least a portion of the microtiter wells, and the antibody is in the form of a solid or liquid.

36. A method of detecting the presence, absence, and/or the concentration of *B. mallei* antibody in a test sample comprising
    (a) contacting a *B. mallei* antigen with a test sample in a test vessel,
    (b) contacting the *B. mallei* antigen with the antibody of claim 1 in the test vessel subsequent to step (a),
    (c) developing a test signal in the test vessel, and
    (d) measuring the test signal from the test vessel.

37. The method of claim 36 further comprising contacting the *B. mallei* antigen with the antibody in a control vessel prior to step (a), during step (a), subsequent to step (a) and prior to step (b), during step (b), or subsequent to step (b) and prior to step (c).

38. The method of claim 37 further comprising developing a control signal in the control vessel and measuring the control signal from the control vessel.

39. The method of claim 38 further comprising converting the test signal from the test vessel and the control signal from the control vessel to a Percentage Inhibition ("PI") value according to the formula: PI=100−[(test signal of test vessel/control signal of the control vessel)×100] to detect the presence, absence, and/or the concentration of *B. mallei* antibody.

40. The method of claim 38, wherein measuring the test and control signals comprises measuring an optical density (OD) of the signal developed in (c).

41. The method of claim 40, wherein percentage inhibition is measured according to the formula: PI=100−[(OD of test vessel/OD of the control vessel)×100].

42. The method of claim 37, wherein developing a signal comprises adding an antibody-detection label conjugate and a label substrate to the test vessel and the control vessel.

43. The method of claim 36, wherein the *B. mallei* antigen is a purified *B. mallei* LPS at a concentration between about 0.1 ng/µl and about 10 ng/µl.

44. The method of claim 36, wherein the antibody is at concentration between about 1 ng/µl and 10 ng/µl.

45. The method of claim 36, wherein the test sample is a diluted sample obtained from a subject, wherein the subject is a human, a non human primate, domestic animal, farm animal, or a laboratory animal.

46. The method of claim 36, wherein the test sample is a diluted sample of a bodily fluid or mucus selected from the group consisting of saliva, sputum, tear, sweat, urine, exudate, blood, serum, plasma, or a vaginal discharge.

47. The method of claim 36, wherein the test sample is a diluted sample diluted at a ratio between about 1:5 and 1:500 (v/v) of the sample to a sample dilution buffer.

48. An isolated antibody, or antigen binding fragment thereof, that has binding specificity to bacterial extract from *Burkholderia mallei, Burkholderia pseudomallei*, or *Burkholderia thailandensis*, the isolated antibody comprising:
    a heavy chain variable domain (VH) comprising three heavy chain complementarity regions (CDRs), VHCDR1, VHCDR2, and VHCDR3, and
    a light chain variable domain (VL) comprising three light chain CDRs, VLCDR1, VLCDR2, and VLCDR3;
    wherein the VHCDR1, VHCDR2, and VHCDR3 are VHCDR1, VHCDR2, and VHCDR3, respectively, of monoclonal antibody B5 produced from a hybridoma deposited under ATCC Accession Deposit Number PTA-127021, and
    wherein the VLCDR1, VLCDR2, and VLCDR3 are VLCDR1, VLCDR2, and VLCDR3, respectively, of monoclonal antibody B5 produced from the hybridoma deposited under ATCC Accession Deposit Number PTA-127021.

49. An isolated antibody, or antigen binding fragment thereof, comprising:
    a heavy chain variable domain (VH) comprising three heavy chain complementarity regions (CDRs), VHCDR1, VHCDR2, and VHCDR3, and
    a light chain variable domain (VL) comprising three light chain CDRs, VLCDR1, VLCDR2, and VLCDR3;
    wherein the VHCDR1, VHCDR2, and VHCDR3 are VHCDR1, VHCDR2, and VHCDR3, respectively, of monoclonal antibody B5 produced from a hybridoma deposited under ATCC Accession Deposit Number PTA-127021, and
    wherein the VLCDR1, VLCDR2, and VLCDR3 are VLCDR1, VLCDR2, and VLCDR3, respectively, of monoclonal antibody B5 produced from the hybridoma deposited under ATCC Accession Deposit Number PTA-127021; and
    wherein the isolated antibody or antigen binding fragment thereof detectably binds purified lipopolysaccharide (LPS) from *Burkholderia mallei, Burkholderia pseudomallei*, or *Burkholderia thailandensis* over bovine serum albumin (BSA) at a ratio of a detection signal from binding to the *Burkholderia mallei* LPS, *Burkholderia pseudomallei* LPS, or *Burkholderia thailandensis* LPS to a detection signal from binding to BSA is between 2:1 and 20:1, when the concentration of purified lipopolysaccharide (LPS) from *Burkholderia mallei, Burkholderia pseudomallei*, or *Burkholderia thailandensis* is between 0.1 ng/µL and 10 ng/µL.

* * * * *